US006097935A

United States Patent [19]

Takahashi et al.

[11] Patent Number: 6,097,935

[45] Date of Patent: Aug. 1, 2000

[54] DATA RECEIVER APPARATUS

[75] Inventors: Oh Takahashi, Tanashi; Shinji Hidaka, Fussa, both of Japan

[73] Assignee: Casio Computer Co., Ltd., Tokyo, Japan

[21] Appl. No.: 08/875,153

[22] PCT Filed: Nov. 8, 1996

[86] PCT No.: PCT/JP96/03281

§ 371 Date: Jun. 27, 1997

§ 102(e) Date: Jun. 27, 1997

[87] PCT Pub. No.: WO97/17681

PCT Pub. Date: May 15, 1997

[30] Foreign Application Priority Data

Nov. 10, 1995 [JP] Japan .................................... 7-317450

[51] Int. Cl.[7] ........................................ H04Q 7/06

[52] U.S. Cl. .................... 455/186.1; 455/38.4; 455/458; 340/825.44

[58] Field of Search ....................... 375/316; 340/825.44, 340/825.48, 825.47; 455/38.4, 38.3, 38.1, 31.2, 186.1, 566, 466, 458, 459

[56] References Cited

U.S. PATENT DOCUMENTS

| | | | |
|---|---|---|---|
| 5,023,905 | 6/1991 | Wells et al. | 379/96 |
| 5,285,493 | 2/1994 | Wagai et al. | 379/57 |
| 5,414,418 | 5/1995 | Andros, Jr. | 340/825.44 |
| 5,561,702 | 10/1996 | Lipp et al. | 379/57 |
| 5,583,921 | 12/1996 | Hidaka | 379/93 |
| 5,784,001 | 7/1997 | Deluca et al. | 340/824.44 |

FOREIGN PATENT DOCUMENTS

| | | | |
|---|---|---|---|
| 2283597 | 5/1995 | United Kingdom | H04B 5/04 |

*Primary Examiner*—Daniel S. Hunter
*Assistant Examiner*—Yemane Woldetatios
*Attorney, Agent, or Firm*—Frishauf, Holtz, Goodman, Langer & Chick, P.C.

[57] ABSTRACT

A data receiver apparatus (1) for receiving a stream of data includes a display (27) for displaying a message in accordance with the received stream of data; and a storage device (19, 28) for storing character data and display control data which respectively correspond to predetermined combinations of bit patterns. A controller (15) extracts a combination of bit patterns from the received data stream, reads out the character data corresponding to the extracted combination of bit patterns when the extracted combination of bit patterns coincides with any one of the predetermined combinations of bit patterns corresponding to the character data, and generates a message to be displayed based on the read out character data. The controller reads out the display control data corresponding to the extracted combination of bit patterns when the extracted combination of bit patterns coincides with any one of the predetermined combinations of bit patterns corresponding to the display control data. The generated message is displayed on the display in accordance with the read-out display control data.

23 Claims, 26 Drawing Sheets

| DIAL DATA (1 DIGIT) | BIT PATTERN | CHARACTER TO BE DISPLAYED IN NP |
|---|---|---|
| 0 | 0000 | 0 |
| 1 | 0001 | 1 |
| 2 | 0010 | 2 |
| 3 | 0011 | 3 |
| 4 | 0100 | 4 |
| 5 | 0101 | 5 |
| 6 | 0110 | 6 |
| 7 | 0111 | 7 |
| 8 | 1000 | 8 |
| 9 | 1001 | 9 |
| *0 | 1011 | U |
| *2 | 1100 | - |
| *4 | 1101 | [ |
| *6 | 1110 | ] |
| *8 | 1111 | SPACE |

FIG.2

| | |
|---|---|
| PASSWORD | 8888 |

TB

| NAME | TELEPHONE NUMBER | PAGER NUMBER | TYPE OF SOUND |
|---|---|---|---|
| AAAA | 000 - 0000 | 1111 - 11 - 1111 | MELODY 1 |
| BBBB | 222 - 2222 | 3333 - 33 - 3333 | MELODY 2 |
| CCCC | 444 - 4444 | 5555 - 55 - 5555 | MELODY 3 |

FIG.7

| MESSAGE NUMBER | FIXED FORM MESSAGE |
|---|---|
| 01 | Urgent |
| 02 | Call me |
| 03 | Return soon |
| 04 | Meet |
| 05 | Go earlier |
| 06 | Go soon |
| 07 | Cancel |
| 08 | Change |
| 09 | Send FAX |
| 10 | Wait |
| 11 | I'll go earlier |
| 12 | I'll go home |
| 13 | I'll be late |
| 14 | Visitor |
| 15 | Trouble |
| 16 | Appointment OK |
| 17 | I'll go soon |
| 18 | OK |
| 19 | NG |
| 20 | Agreed |

FIG.10

| | | 0 | 1 | 2 | 3 | 4 | 5 | 6 | 7 | 8 | 9 | ∗2 | ∗4 | ∗6 | ∗8 | ∗0 |
|---|---|---|---|---|---|---|---|---|---|---|---|---|---|---|---|---|
| | ROW \ COLUMN | 0000 | 0001 | 0010 | 0011 | 0100 | 0101 | 0110 | 0111 | 1000 | 1001 | 1100 | 1101 | 1110 | 1111 | 1011 |
| 0 | 0000 | 0 | 1 | 2 | 3 | 4 | 5 | 6 | 7 | 8 | 9 | | | | | |
| 1 | 0001 | A | B | C | D | E | F | G | H | I | J | | | | | |
| 2 | 0010 | K | L | M | N | O | P | Q | R | S | T | | | | | |
| 3 | 0011 | U | V | W | X | Y | Z | SP | DEL | ( | ) | | | | | |
| 4 | 0100 | a | b | c | d | e | f | g | h | i | j | | | | | |
| 5 | 0101 | k | l | m | n | o | p | q | r | s | t | | | | | |
| 6 | 0110 | u | v | w | x | y | z | [ | ] | { | } | | | | | |
| 7 | 0111 | ! | " | # | $ | % | & | ' | ∗ | + | , | | | | | |
| 8 | 1000 | — | . | / | ; | : | < | = | > | ? | @ | DCC1 | DCC2 | DCC3 | DCC4 | DCC5 |
| 9 | 1001 | \ | ^ | _ | \| | ` | ~ | RESER-VED | RESER-VED | RESER-VED | RESER-VED | DCC6 | DCC7 | DCC8 | DCC9 | DCC10 |

← DIAL DATA

← BIT PATTERN

A

| DISPLAY CONTROL CODE | | | NAME OF CONTROL | CONTENTS OF CONTROL | LIMITED NUMBER OF DIGIT |
|---|---|---|---|---|---|
| | BIT PATTERN | DIAL DATA | | | |
| DCC1 | 10001100 | 8*2 | INSTRUCTION OF REPLY | ADD ILLUSTRATION "" IN FRONT OF RECEIVED MESSAGE AND MESSAGE "Please send me your answer" IN REAR THEREOF | |
| DCC2 | 10001101 | 8*4 | DISPLAY OF GREETING PHRASE | ADD GREETING PHRASE AS TIME MESSAGE CORRESPONDING TO RECEPTION TIME IN FRONT OF RECEIVED MESSAGE<br>MORNING 4:00 - 10:00 "Good morning!"<br>DAYTIME 10:00 - 17:00 "Hello!"<br>EVENING 17:00 - 23:00 "Good evening!"<br>NIGHT 23:00 - 4:00 "Sorry to call you at night" | |
| DCC3 | 10001110 | 8*6 | REVERCE DISPLAY | REVERCE-DISPLAY OF RECEIVED MESSAGE | |
| DCC4 | 10001111 | 8*8 | URGENT MESSAGE | DISPLAY CALL RECEIPT MESSAGE AND NOTIFY IT WITH SPEAKER AND VIBRATOR ALTERNATELY | |

FIG.12A

| | | | | | |
|---|---|---|---|---|---|
| DCC5 | 10001011 | 8*0 | DISPLAY OF FIXED FORM MESSAGE | DISPLAY FIXED FORM MESSAGE BASED ON FOLLOWING DIAL DATA | 2 |
| DCC6 | 10011100 | 9*2 | ALARM MEMO | DISPLAY RECEIVED MESSAGE AND NOTIFY WITH MELODY AT TIME APPOINTED BY FOLLOWING DIAL DATA (4 DIGITS) | 4 |
| DCC7 | 10011101 | 9*4 | DISPLAY OF APPOINTED TIME | DISPLAY "at ○○ - ○○" IN RECEIVED MESSAGE (FOLLOWING 4-DIGIT DIAL DATA IN ○○○○) | 4 |
| DCC8 | 10011110 | 9*6 | DISPLAY OF NAME OF SENDER | RETRIEVE FINAL 4 DIGITS OF TEL NO. DATA IN TEL BANK MEMORY TB BASED ON FOLLOWING 4-DIGIT DIAL DATA AND DISPLAY NAME OF SENDER | 4 |
| DCC9 | 10011111 | 9*8 | DISPLAY OF GREEK CHARACTER | RETRIEVE FREE WORD MATRIX BASED ON FOLLOWING 2-DIGIT DIAL DATA AND DISPLAY CONTROL CODE AND DISPLAY CORRESPONDING GREEK CHARACTER | 2 |
| DCC10 | 10011011 | 9*0 | SECRET MESSAGE | SECRET DISPLAY OF RECEIVED MESSAGE AND SUSPEND SECRET DISPLAY BY INPUTTING PASSWORD | |

FIG.12B

| | | 0 | 1 | 2 | 3 | 4 | 5 | 6 | 7 | 8 | 9 | *2 | *4 | *6 | *8 |
|---|---|---|---|---|---|---|---|---|---|---|---|---|---|---|---|
| | | 0000 | 0001 | 0010 | 0011 | 0100 | 0101 | 0110 | 0111 | 1000 | 1001 | 1100 | 1101 | 1110 | 1111 |
| 0 | 0000 | 0 | 1 | 2 | 3 | 4 | 5 | 6 | 7 | 8 | 9 | NUL | SOH | STX | ETX |
| 1 | 0001 | A | B | C | D | E | F | G | H | I | J | EOT | ENQ | ACK | BEL |
| 2 | 0010 | K | L | M | N | O | P | Q | R | S | T | BS | TAB | LF | VT |
| 3 | 0011 | U | V | W | X | Y | Z | SP | DEL | ( | ) | FF | CR | SO | SI |
| 4 | 0100 | a | b | c | d | e | f | g | h | i | j | DC1 | DC2 | DC3 | DC4 |
| 5 | 0101 | k | l | m | n | o | p | q | r | s | t | DLE | NAK | SYN | ETB |
| 6 | 0110 | u | v | w | x | y | z | [ | ] | { | } | CAN | EM | SUB | ESC |
| 7 | 0111 | ! | " | # | $ | % | & | ' | * | + | , | FS | GS | RS | US |
| 8 | 1000 | — | . | / | ; | : | < | = | > | ? | @ | DCC1 | DCC2 | DCC3 | DCC4 |
| 9 | 1001 | \ | ^ | _ | \| | ` | ~ | RESERVED | RESERVED | RESERVED | RESERVED | DCC5 | DCC6 | DCC8 | DCC10 |

DIAL DATA

BIT PATTERN

ROW

CHARACTER TO BE DISPLAYED

DISPLAY CONTROL CODE

FIG.25

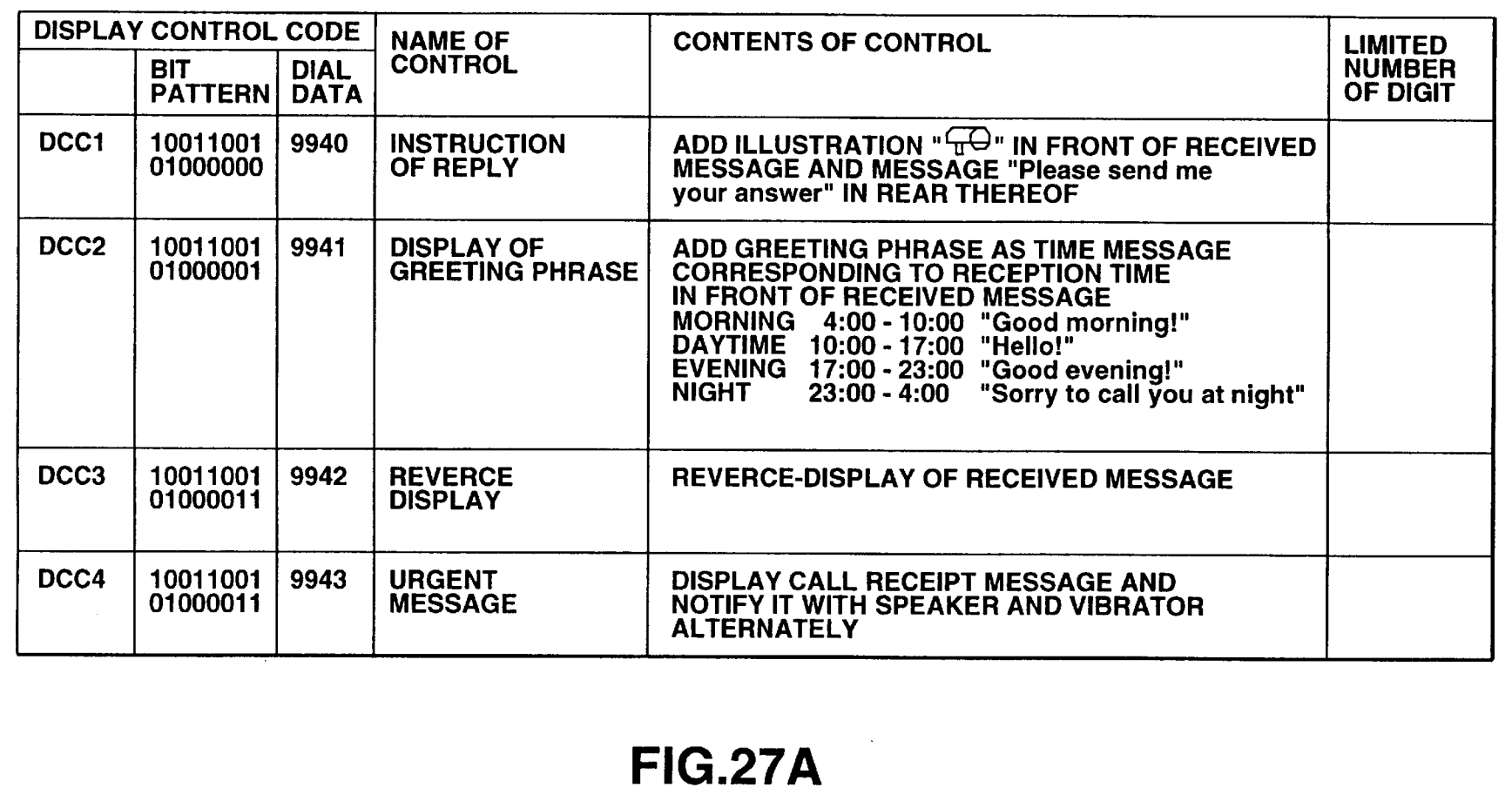

| DISPLAY CONTROL CODE | | | NAME OF CONTROL | CONTENTS OF CONTROL | LIMITED NUMBER OF DIGIT |
|---|---|---|---|---|---|
| | BIT PATTERN | DIAL DATA | | | |
| DCC1 | 10011001 01000000 | 9940 | INSTRUCTION OF REPLY | ADD ILLUSTRATION " " IN FRONT OF RECEIVED MESSAGE AND MESSAGE "Please send me your answer" IN REAR THEREOF | |
| DCC2 | 10011001 01000001 | 9941 | DISPLAY OF GREETING PHRASE | ADD GREETING PHRASE AS TIME MESSAGE CORRESPONDING TO RECEPTION TIME IN FRONT OF RECEIVED MESSAGE<br>MORNING 4:00 - 10:00 "Good morning!"<br>DAYTIME 10:00 - 17:00 "Hello!"<br>EVENING 17:00 - 23:00 "Good evening!"<br>NIGHT 23:00 - 4:00 "Sorry to call you at night" | |
| DCC3 | 10011001 01000011 | 9942 | REVERCE DISPLAY | REVERCE-DISPLAY OF RECEIVED MESSAGE | |
| DCC4 | 10011001 01000011 | 9943 | URGENT MESSAGE | DISPLAY CALL RECEIPT MESSAGE AND NOTIFY IT WITH SPEAKER AND VIBRATOR ALTERNATELY | |

FIG.27A

| | | | | | |
|---|---|---|---|---|---|
| DCC5 | 10011001 01000100 | 9944 | DISPLAY OF FIXED FORM MESSAGE | DISPLAY FIXED FORM MESSAGE BASED ON FOLLOWING DIAL DATA | 2 |
| DCC6 | 10011001 01000110 | 9945 | ALARM MEMO | DISPLAY RECEIVED MESSAGE AND NOTIFY WITH MELODY AT TIME APPOINTED BY FOLLOWING DIAL DATA (4 DIGITS) | 4 |
| DCC7 | 10011001 01000111 | 9946 | DISPLAY OF APPOINTED TIME | DISPLAY "at ○○ - ○○" IN RECEIVED MESSAGE (FOLLOWING 4-DIGIT DIAL DATA IN ○○○○) | 4 |
| DCC8 | 10011001 01001000 | 9947 | DISPLAY OF NAME OF SENDER | RETRIEVE FINAL 4 DIGITS OF TEL NO. DATA IN TEL BANK MEMORY TB BASED ON FOLLOWING 4-DIGIT DIAL DATA AND DISPLAY NAME OF SENDER | 4 |
| DCC9 | 10011001 01001001 | 9948 | DISPLAY OF GREEK CHARACTER | RETRIEVE FREE WORD MATRIX BASED ON FOLLOWING 2-DIGIT DIAL DATA AND DISPLAY CONTROL CODE AND DISPLAY CORRESPONDING GREEK CHARACTER | 2 |
| DCC10 | 10011011 | 9949 | SECRET MESSAGE | SECRET DISPLAY OF RECEIVED MESSAGE AND SUSPEND SECRET DISPLAY BY INPUTTING PASSWORD | |

FIG.27B

COLUMN →

| | | 0 | 1 | 2 | 3 | 4 | 5 | 6 | 7 | 8 | 9 |
|---|---|---|---|---|---|---|---|---|---|---|---|
| | | 0000 | 0001 | 0010 | 0011 | 0100 | 0101 | 0110 | 0111 | 1000 | 1001 |
| 0 | 0000 | 0 | 1 | 2 | 3 | 4 | 5 | 6 | 7 | 8 | 9 |
| 1 | 0001 | A | B | C | D | E | F | G | H | I | J |
| 2 | 0010 | K | L | M | N | O | P | Q | R | S | T |
| 3 | 0011 | U | V | W | X | Y | Z | SP | DEL | ( | ) |
| 4 | 0100 | a | b | c | d | e | f | g | h | i | j |
| 5 | 0101 | k | l | m | n | o | p | q | r | s | t |
| 6 | 0110 | u | v | w | x | y | z | [ | ] | { | } |
| 7 | 0111 | ! | " | # | $ | % | & | ' | * | + | , |
| 8 | 1000 | — | . | / | ; | : | < | = | > | ? | @ |
| 9 | 1001 | \ | ^ | _ | \| | ` | ~ | RESER-VED | RESER-VED | RESER-VED | DCC M |

DIAL DATA

BIT PATTERN

ROW ↓

CHARACTER TO BE DISPLAYED →

FIG.29

DIAL DATA

DISPLAY CONTROL CODE

BIT PATTERN

ROW

| | | 0 | 1 | 2 | 3 | 4 | 5 | 6 | 7 | 8 | 9 |
|---|---|---|---|---|---|---|---|---|---|---|---|
| | | 0000 | 0001 | 0010 | 0011 | 0100 | 0101 | 0110 | 0111 | 1000 | 1001 |
| 0 | 0000 | NUL | SOH | STX | ETX | EOT | ENQ | ACK | BEL | BS | TAB |
| 1 | 0001 | LF | VT | FF | CR | SO | SI | DLE | DC1 | DC2 | DC3 |
| 2 | 0010 | DC4 | NAK | SYN | ETB | CAN | EM | SUB | ESC | FS | GS |
| 3 | 0011 | RS | US | RESERVED | RESERVED | RESERVED | RESERVED | RESERVED | RESERVED | RESERVED | RESERVED |
| 4 | 0100 | DCC1 | DCC2 | DCC3 | DCC4 | DCC5 | DCC6 | DCC7 | DCC8 | DCC9 | DCC10 |
| 5 | 0101 | | | | | | | | | | |
| 6 | 0110 | | | | | | | | | | |
| 7 | 0111 | | | | | | | | | | |
| 8 | 1000 | | | | | | | | | | |
| 9 | 1001 | | | | RESERVED | RESERVED | RESERVED | RESERVED | RESERVED | RESERVED | RESERVED |

ILLUSTRATION TO BE DISPLAYED

| COLUMN / ROW | 1 | 2 | 3 | 4 | 5 | 6 | 7 | 8 | 9 | 0 |
|---|---|---|---|---|---|---|---|---|---|---|
| 1 | ア | イ | ウ | エ | オ | A | B | C | D | E |
| 2 | カ | キ | ク | ケ | コ | F | G | H | I | J |
| 3 | サ | シ | ス | セ | ソ | K | L | M | N | O |
| 4 | タ | チ | ツ | テ | ト | P | Q | R | S | T |
| 5 | ナ | ニ | ヌ | ネ | ノ | U | V | W | X | Y |
| 6 | ハ | ヒ | フ | ヘ | ホ | Z | ? | ! | — | ／ |
| 7 | マ | ミ | ム | メ | モ | ¥ | & |  | ☎ | ☕ |
| 8 | ヤ | ( | ユ | ) | ヨ | * | # | SPACE | | |
| 9 | ラ | リ | ル | レ | ロ | 1 | 2 | 3 | 4 | 5 |
| 0 | ワ | ヲ | ン | ゛ | ゜ | 6 | 7 | 8 | 9 | 0 |

| | | | | | | | | | | | | |
|---|---|---|---|---|---|---|---|---|---|---|---|---|
| | | | | B7 | 0 | 0 | 0 | 0 | 1 | 1 | 1 | 1 |
| | | | | B6 | 0 | 0 | 1 | 1 | 0 | 0 | 1 | 1 |
| | | | | B5 | 0 | 1 | 0 | 1 | 0 | 1 | 0 | 1 |
| B4 | B3 | B2 | B1 | HEX | 0 | 1 | 2 | 3 | 4 | 5 | 6 | 7 |
| 0 | 0 | 0 | 0 | 0 | NUL | DLE | SP | 0 | @ | P | ` | p |
| 0 | 0 | 0 | 1 | 1 | SOH | DC1 | ! | 1 | A | Q | a | q |
| 0 | 0 | 1 | 0 | 2 | STX | DC2 | " | 2 | B | R | b | r |
| 0 | 0 | 1 | 1 | 3 | ETX | DC3 | # | 3 | C | S | c | s |
| 0 | 1 | 0 | 0 | 4 | EOT | DC4 | $ | 4 | D | T | d | t |
| 0 | 1 | 0 | 1 | 5 | ENQ | NAK | % | 5 | E | U | e | u |
| 0 | 1 | 1 | 0 | 6 | ACK | SYN | & | 6 | F | V | f | v |
| 0 | 1 | 1 | 1 | 7 | BEL | ETB | ' | 7 | G | W | g | w |
| 1 | 0 | 0 | 0 | 8 | BS | CAN | ( | 8 | H | X | h | x |
| 1 | 0 | 0 | 1 | 9 | TAB | EM | ) | 9 | I | Y | i | y |
| 1 | 0 | 1 | 0 | A | LF | SUB | * | : | J | Z | j | z |
| 1 | 0 | 1 | 1 | B | VT | ESC | + | ; | K | [ | k | { |
| 1 | 1 | 0 | 0 | C | FF | FS | , | < | L | \ | l | \| |
| 1 | 1 | 0 | 1 | D | CR | GS | - | = | M | ] | m | } |
| 1 | 1 | 1 | 0 | E | SO | RS | . | > | N | ^ | n | ~ |
| 1 | 1 | 1 | 1 | F | SI | US | / | ? | O | _ | o | DEL |

FIG.32

DATA RECEIVER APPARATUS

TECHNICAL FIELD

The present invention relates to a data receiver apparatus, and more particularly to a data receiver apparatus having a message display function.

BACKGROUND ART

Hitherto, a data communication system using a telephone line includes a home banking system and a pager system which is one of selective calling systems. In the data communication system, the efficiency of using the communication line is improved by limiting an amount of data in one communication operation from a data sender to a pager of a destination of the call (a called pager).

Therefore, a data sender is permitted to transmit, to the pager, only the telephone number, to which a called party should call or reply. Moreover, even if an amount of data which is to be transmitted in one communication operation is large, only time information and information specifying the day and time can be transmitted as well as the telephone number to which the called party should call.

When a numeric message is transmitted from a data sender to the numeric pager, a push phone generally is the most appropriate data transmission device. That is, a data sender operates a ten-key of the public push phone connected to the telephone network to follow an announced operation instruction transmitted from a paging service company to input a message so as to transmit it to the pager.

In a pager system using a push phone as the data transmitting apparatus, conforming RCR STD-43 standard shown in FIG. 31, the data sender operates numeric keys for specifying kana characters and alphabets of two digits, except numerals, in accordance with a free word conversion matrix to input a message formed by the free word data which is to be transmitted to the pager. Therefore, the free word data is transmitted to the pager through the paging service. Thus, a message including kana and alphabets, except numerals, can be displayed.

When the free word data is transmitted, the data sender first operates the push key to input an identification code in the form of two digits dial data as "*2*2"(--:hyphen hyphen) indicating that the following data is free message data, and then inputs free word data. The pager which has received the above data recognizes that received data is the free word data in accordance with the identification code, and then makes a reference to the free word conversion matrix table storing data following the identification code so as to convert the above data into kana characters and alphabets which are then displayed.

However, since display of a message using the free word data on a numeric pager of the conventional pager system has a format of the free word conversion matrix table limited to 10×10=100 types, display can be performed only with the 100 combinations of characters (katakana, alphabets, numerals, illustrations, and symbols). What is worse, an amount of data which can be transmitted is defined such that one character is expressed by two digits (8 bits) of numerals. Therefore, a rate of occupying the message data in the transmission data is larger than the fixed form message.

Therefore, when data transmission is performed by using the free word, the data sender encounters a difficulty in transmitting the inputted free word data and additional data including data for displaying the name of the data sender, urgent message data (including notification control as well as display control) and the like in one communication operation.

The paging service includes the following two main services to be adaptable to the type of the message data which is received by the pager.

One of the services is NP paging service in which a pager number (calling number) of the called pager is input by the data sender and a message is input by the push dial. A service center of the paging service which has received message transmits a stream of data composed of a 4-bit pattern corresponding to the dial data. A numerical pager (hereinafter expressed as "NP") receives the stream of data so that a message in the form of a string of numerals corresponding to the dial numbers is displayed.

Another service is IP paging service in which a data sender requests paging, and then announces a message to an operator of the service center. The operator converts the message into the message data composed of 7-bit code data in accordance with a set of alphanumeric characters shown in FIG. 32, and then transmits the message data to the pager. Thus, the alphanumerically pager (hereinafter called "IP") receives data so that the message in the form of characters is displayed.

Although the two paging services are used widely, existence of the two types of paging services results in data transmission of a message formed of simple characters to a pager being impossible to be received and displayed in a case where the pager used by the called party is NP. As a result, the data sender sometimes feels inconvenience.

The alphanumeric character set shown in FIG. 32 is in the form of a code matrix called ISO 646-1983E conforming to International Organization for Standardization (ISO) which enables control characters from "00" (HEX) to "0F" (HEX) or those from "10" (HEX) to "1F" (HEX) to be adapted to character types of various nations and thus to be extended. Thus, the set is used widely.

However, if the character set is intended to be adapted to the NP paging service, it cannot satisfactorily be adapted to dial data. The NP cannot receive the message data conforming to the alphanumeric set and display a character message.

An object of the present invention is to provide a data receiver apparatus in which control information for instructing display of a name of a data sender, an urgent call, and the like are simultaneously received with a message based on the received free word data so that the forms of display and notification of the free word message are controlled on the basis of control information.

Another object of the present invention is to provide a data receiver apparatus which can be adapted to the dial data and which is capable of displaying a message in the form of an alphanumeric set.

SUMMARY OF THE INVENTION

According to one aspect of the present invention, a data receiver apparatus comprises:

receiving means for receiving a stream of data;

display means for displaying a message on the basis of the stream of data received by said receiving means;

first storage means for storing plural first data to be read out in accordance with a first predetermined combination of bit patterns included in the stream of data received by said receiving means and for specifying a first character display on said display means; and second storage means for storing plural second data in accordance with a second predetermined combination of bit patterns included in the stream of data received by said receiving means.

According to the present invention, recited in claim 1, when the stream of data is received and a message according to the received data is displayed, character data is specified in accordance with a predetermined combination of bit patterns read out from the first receiving means so as to generate a message, and data except the character data is specified in accordance with a combination of bit patterns except the predetermined combination.

Therefore, the data receiver apparatus stores data specifying character in accordance with a predetermined combination of bit patterns and displays a message based on the character. When the data receiver apparatus detects a control code in response to a combination of bit patterns except the predetermined combination, it displays an illustration together with the message. Therefore, a data sender is only required to input dial data by operating dials by three times so that a free word including data for instructing display of the illustration is transmitted. The data receiver apparatus is able to simultaneously display the illustration and the free word. Therefore, the data input can easily be performed by the data sender.

By receiving a combination of bit patterns except the predetermined combination, the contents of display control with which a greeting phrase registered correspondingly to time zone of call reception can be displayed together with the received message. Therefore, labor for inputting the greeting phrase can be eliminated and an amount of data to be transmitted can be saved. As a result, the reduction in an amount of transmission data enables an exclusive message including illustration data or the like can be displayed on the called pager.

According to another aspect of the present invention, there is provided a data receiver apparatus receiving a stream of data and comprising display means for displaying a message in accordance with the stream of data received, the apparatus comprising:

storage means for storing plural character data read in correspondence with a predetermined combination of bit patterns; and control means for reading the bit patterns from the string of data received to combine the bit patterns and reading character data corresponding to the bit patterns from said storage means to generate a message, and controlling display of the generated message on said display means when a combination of bit patterns except the predetermined combination is detected.

According to this aspect of the present invention, the data receiver apparatus receives a stream of data and displays a message in accordance with the received data. The data receiver apparatus stores plural character data to be read in accordance with a predetermined combination of bit patterns, reads character data in accordance with a bit pattern combination to generate a message, and displays the generated message when a combination of bit patterns except the predetermined combination is detected.

Therefore, when the data receiver apparatus detects a combination of bit patterns except the predetermined combination of bit patterns for specifying character data, control can be performed to reversely display character data in the received message. Thus, if a data sender uses this function in transmitting an important message or the like, the data sender can be caused to pay attention. Therefore, the expression form of a received message can be varied.

By receiving, for example, a bit pattern of dial data for specifying a fixed form message (so-called canned message) following the bit pattern as the contents of display control in accordance with the combination of bit patterns, a fixed form message can be displayed in the received message. Therefore, the data sender is able to save labor for inputting a symbol denoting start of a fixed form message and therefore an amount of data to be transmitted can be reduced.

In accordance with an employed combination of bit patterns, time, at which the received message is displayed, is instructed as the contents of display control by using dial data of four digits following the combination of the bit patterns. Thus, a string of the bit pattern corresponding to the received message can be displayed at the appointed time. In a case where the data sender must inform the destination of the call the message at the appointed time, labor in view of time schedule for the data sender can be reduced.

Moreover, an appointed time display function can easily be provided for a message receiver. In accordance with the combination of the bit patterns, dial data of four digits following a combination of bit patterns is, as the contents of display control, made to be time appointment data, which is displayed in a received message, "at", "-(hyphen)", and a corresponding bit pattern can be added and displayed in time appointment data. Therefore,. the data sender is able to save labor for inputting dial for specifying "at" and "-(hyphen)".

As a result, an amount of data, which must be transmitted, can be reduced. In accordance with the combination of the bit patterns, for example, a bit pattern corresponding to dial data of four digits following a combination of the bit patterns is received so that a bit pattern corresponding to data sender registered previously in the data receiver apparatus is displayed. Therefore, the data sender is able to save labor required to input own name. Moreover, an amount of data which must be transmitted can be reduced.

In accordance with the combination of the bit patterns, a bit pattern corresponding to dial data of two digits following the combination of the bit patterns is received so that an instructed character is displayed in the form of a Greek character as the contents of display control. Therefore, expression of a received message can be varied.

In accordance with the combination of the bit patterns, for example, secret display with which the contents of a received message are not displayed can easily be realized, as the contents of display control. Moreover, when a password, which is registered previously is input, the contents of the received message can be displayed. Therefore, the secret message function for the data receiver apparatus can easily be realized.

Moreover, in accordance with the combination of the bit patterns, display of the received message and the contents of information of supply of a message can be controlled as the contents of display control. Therefore, the data sender is required to only input dial data to control the contents of information. As a result, the data receiver apparatus is able to easily vary the form of informing the message during display of the received message.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 2 shows a conversion table which is stored in a communication service center 4 shown in FIG. 1;

FIG. 7 shows the memory structure of the TEL bank memory TB in the RAM 17 shown in FIG. 5;

FIG. 10 shows the contents of the fixed form message table which is stored in the ROM 18 shown in FIG. 4;

FIGS. 12A and 12B show a display control table which is stored in the display control memory shown in FIG. 4;

FIG. 25 shows a free word conversion matrix according to a second embodiment which is stored in the free word memory 19 shown in FIG. 4;

FIGS. 27A and 27B show a display control table which is stored in the display control memory 157 shown in FIG. 26;

FIG. 29 shows a free word conversion matrix table which is stored in the free word memory 28 shown in FIG. 26;

FIG. 32 shows an alphanumeric code table conforming to ISO 646-1983E.

DETAILED DESCRIPTION

First Embodiment

A first embodiment of the present invention will now be described with reference to the drawings.

FIGS. 1 to 24 show a first embodiment of a pager system in which a data receiver apparatus according to the present invention is applied to an NP pager system.

First, the structure of this embodiment will now be described.

Figure 1:
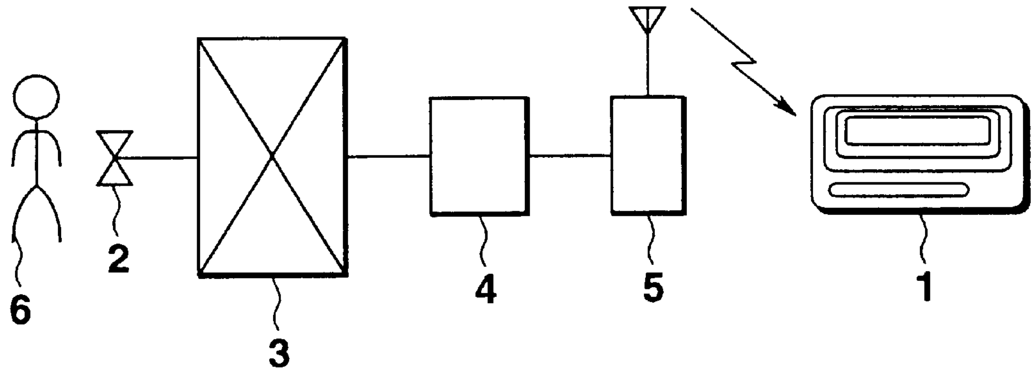
FIG. 1 shows the schematic structure of an embodiment of a radio pager system to which the present invention is adapted.

FIG. 1 shows the overall schematic structure of a radio pager system according to this embodiment for use in the NP paging service. A data sender 6 operates a push phone 2 in order to page a third party and transmit the message data from the push phone 2. As a result, the push phone 2 is, through a public switched telephone network 3, connected to a paging center 4.

The paging center 4 sequentially converts the pager number (dial number) input by the data sender 6 by operating the push phone 2 and the dial-inputted message data into bit patterns in accordance with a conversion table shown in FIG. 2. Therefore, the formed bit patterns is transmitted from the transmission base station 5 to the pager 1 of the third party.

The paging center 4 stores the ID code of the pager 1 and the pager number while making them coincide with each other and receives the pager number of the pager 1 and the message data transmitted from the push phone 2 through the public switched telephone network 3 so as to convert them into bit patterns and subject the same to a predetermined signal processing and transmit the same to the transmission base station 5. As a result, the ID code for paging the pager 1 and the message data are transmitted from the transmission base station 5.

Thus, the pager 1, to which the same ID code as that of the transmitted ID code is assigned, is paged, and simultaneously the transmitted message data is received.

The paging center 4 converts one-digit dial data "0" to "9", "*0", "*2", "*4", "*6", and "*8" into a 4-bit bit pattern in accordance with the conversion table shown in FIG. 2 to generate a transmission signal which is transmitted to the pager 1 through the transmission base station 5.

Figure 3C:
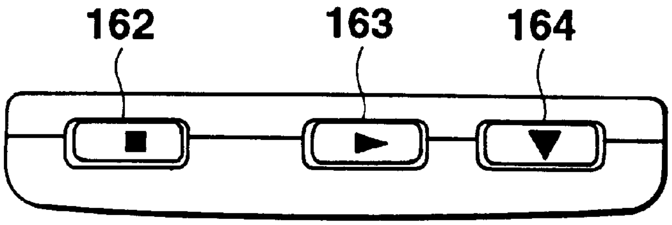
FIGS. 3A, 3B, and 3C show the shape of the pager 1 shown in FIG. 1.
Figure 3B:
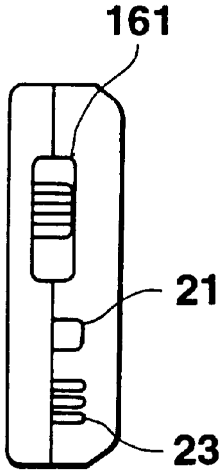
Figure 3A:
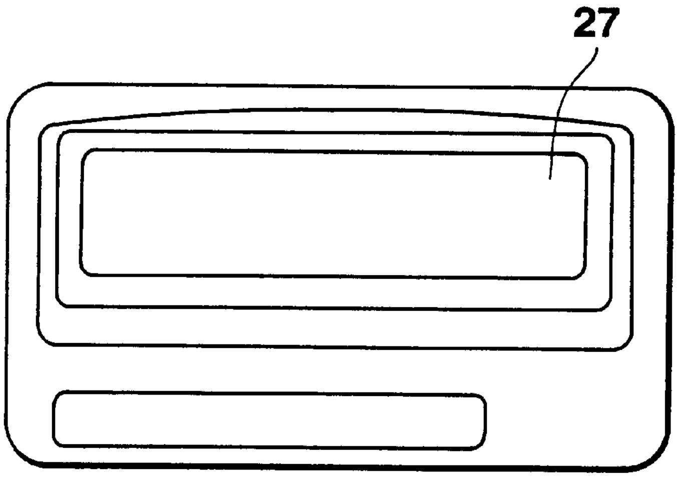

FIGS. 3A to 3C are a schematic view of the pager 1. FIG. 3A is a front view, FIG. 3B is a left side view, and FIG. 3C is a top view.

As shown, the pager 1 has, on the front surface thereof, a display 27 comprising a liquid crystal display panel of a dot matrix type. The pager 1 has, on the left side thereof, a slide type main switch 161 for turning on/off the power supply, an LED 21 for informing receipt of the ID code and the message data by flashing on/off, and a speaker 23 for informing the same with 5 sound. The pager 1 has, on the top surface thereof, a suspension key 162 for canceling a variety of set operations of the pager 1, a cursor key 163 for specifying the mode and for moving the cursor in the horizontal direction in the message displayed on the 10 display 27, and a memory key 164 for vertically moving the cursor in the message displayed on the display 27. The main switch 161 can be used as a push button and, in this case, serves as a key for indicating "determination" of a variety of set operations.

The structure of blocks of a circuit provided in the pager 1 shown in FIG. 3 will now be described with reference to FIG. 4.

Figure 4:
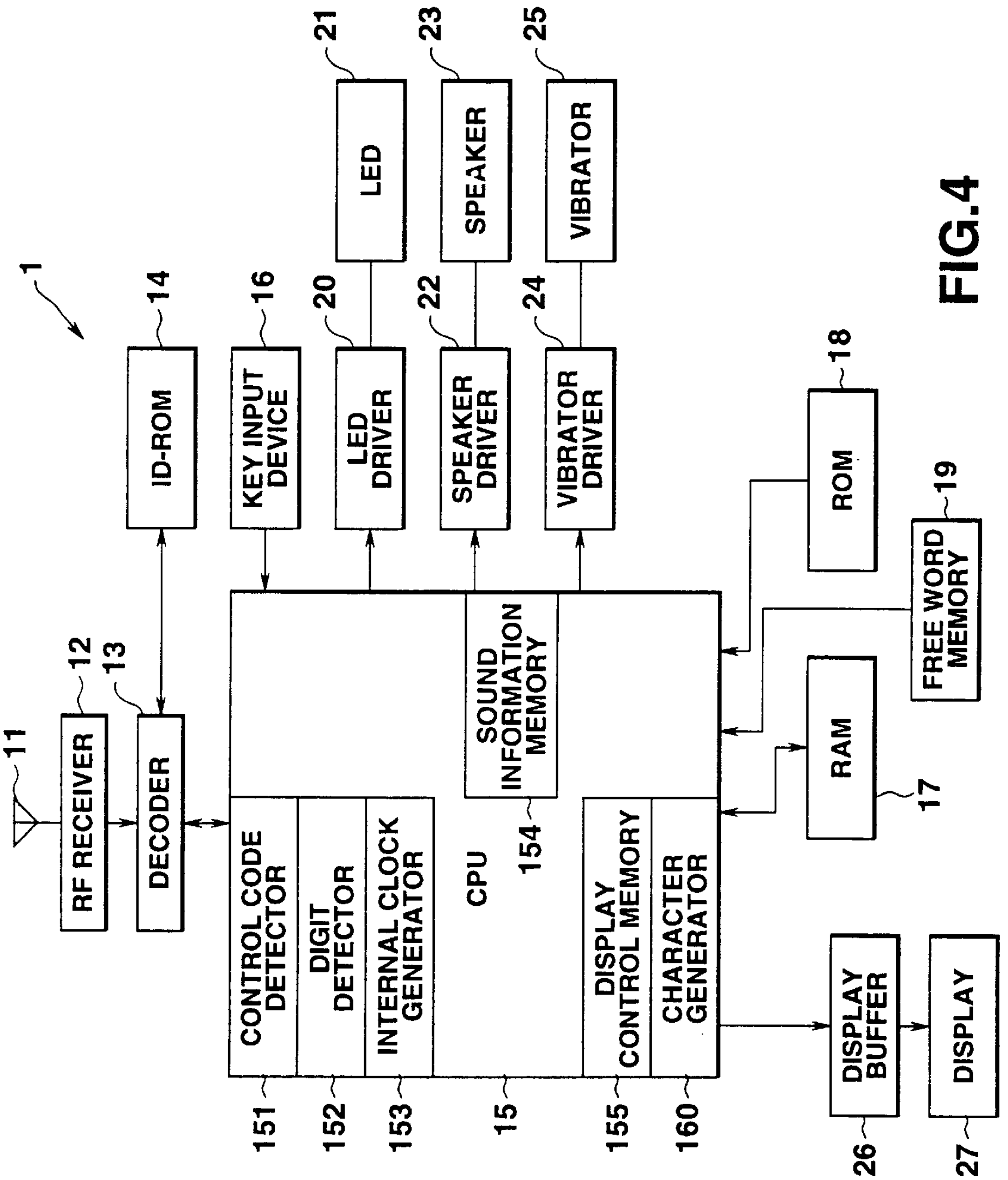
FIG. 4 is a circuit diagram showing the pager 1 shown in FIG. 3.

Referring to FIG. 4, the pager 1 comprises an antenna 11, an RF receiver 12, a decoder 13, an ID-ROM 14, a CPU 15, a key input device 16, a RAM 17, a ROM 18, a free word memory 19, an LED driver 20, an LED 21, a speaker driver 22, a speaker 23, a vibrator driver 24, a vibrator 25, a display buffer 26, and a display 27.

The antenna 11 receives a radio signal transmitted from the transmission base station 5 shown in FIG. 1 to supply the radio signal to the RF receiver 12. The operation of the RF receiver 12 is controlled in accordance with a control signal supplied from the decoder 13 which is controlled by the CPU 15 so as to intermittently receive the radio signal supplied through the antenna 11, and then demodulate and detect the radio signal so as to supply an obtained signal to the decoder 13.

The decoder 13 compares address data of the ID code included in the radio signal received and detected by the RF receiver 12 and address data stored in the ID-ROM 14. If they coincide with each other, the message data following the ID code included in the radio signal is supplied to the CPU 15.

The ID-ROM 14 stores ID codes, such as frame data and address data, assigned by the paging center 4 in order to receive fixed form message data and service information data set for each pager. The ID codes are transmitted to the decoder 13. In a period in which the power source is turned on, the ID codes are stored in the decoder 13.

The CPU (Central Processing Unit) 15, in accordance with each control program stored in the ROM 18, stores the message data supplied from the decoder 13 into an input register (not shown) of the CPU 15, and controls each circuit in the pager 1 in accordance with a control signal supplied from the key input device 16.

The CPU 15 includes a control code detector 151 for detecting a control code formed by 4-bit bit pattern corresponding to dial data "*0", "*2", "*4", "*6", and "*8" included in supplied message data, a digit detector 152 for detecting a number of digits of dial data corresponding to a bit pattern following the control code, an internal clock generator 153 having an internal clock function, a sound information memory 154 for storing sound type information in the form of digital data, such as melody, which is transmitted when sound notification operation is performed, and a display control memory 155 for storing contents of control, such as control of display of a message which is displayed on, for example, the display 27 in accordance with the generated notification control code into a display control table shown in FIGS. 12A and 12B. The CPU 15 also has a character generator for generating a message from the received message data.

If the CPU 15 detects a free word start symbol defined as a combination of 4-bit bit patterns "11001100" (dial data "*2*2") in the message data supplied from the decoder 13 in the message data receiving process to be described later, and if it is detected by the control code detector 151 that control codes "1011", "1100", "1101", "1110", and "1111" are included in the free word of the message data, the CPU 15 generates a 4-bit bit pattern in front of the control code and the display control code from the bit pattern so as to detect whether or not the number of digits of dial data defined by the bit pattern following the generated display control code is appropriate for the number of digits of dial data corresponding to the display control code. Then, the CPU 15 retrieves the contents of control corresponding to the display control code in the display control memory 155. Then, the CPU 15 performs control such that a message based on the message data is displayed in accordance with the result of retrieval of the contents of control. If no display control code is included in the free word in the process of receiving the message data, the CPU 15 performs control in which the free word is converted into a corresponding character in accordance with a free word conversion matrix table stored in the free word memory 19 so that a message is generated and then displayed on the display 27.

The key input device 16, as shown in FIG. 3, comprises, a main switch 161, a suspension key 162, a cursor key 163, and a memory key 164 and supplies a control signal for each of the above operations to the CPU 15.

Figure 5:
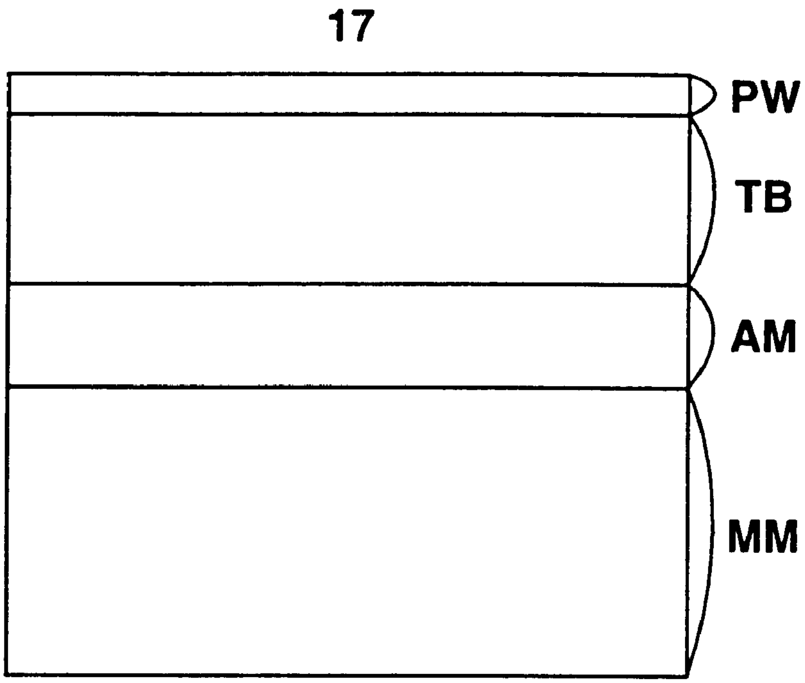
FIG. 5 shows the memory structure of the RAM 17 shown in FIG. 4.

The RAM (Random Access Memory) 17 provides a memory area for temporarily storing data, which is being processed by the CPU 15 during the message data receiving process, and provides each memory area for a password memory PW, a TEL bank memory TB, an alarm memory AM, and a message memory MM shown in FIG. 5.

Figure 6:
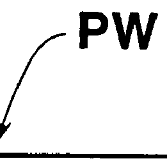
FIG. 6 shows the memory structure of the password memory PW in the RAM 17 shown in FIG. 5.

The password memory PW shown in FIG. 5 is a memory area for storing a password of, for example, four digits (for example "8888"), as shown in FIG. 6. The password is set when a predetermined key is inputted by a user of the pager 1 and corresponds to contents of control "DCC10" instructed with display control code "10011011" (dial data "9*0"). The password is input when the secret message is to be displayed by a user of the pager 1.

Figure 8:
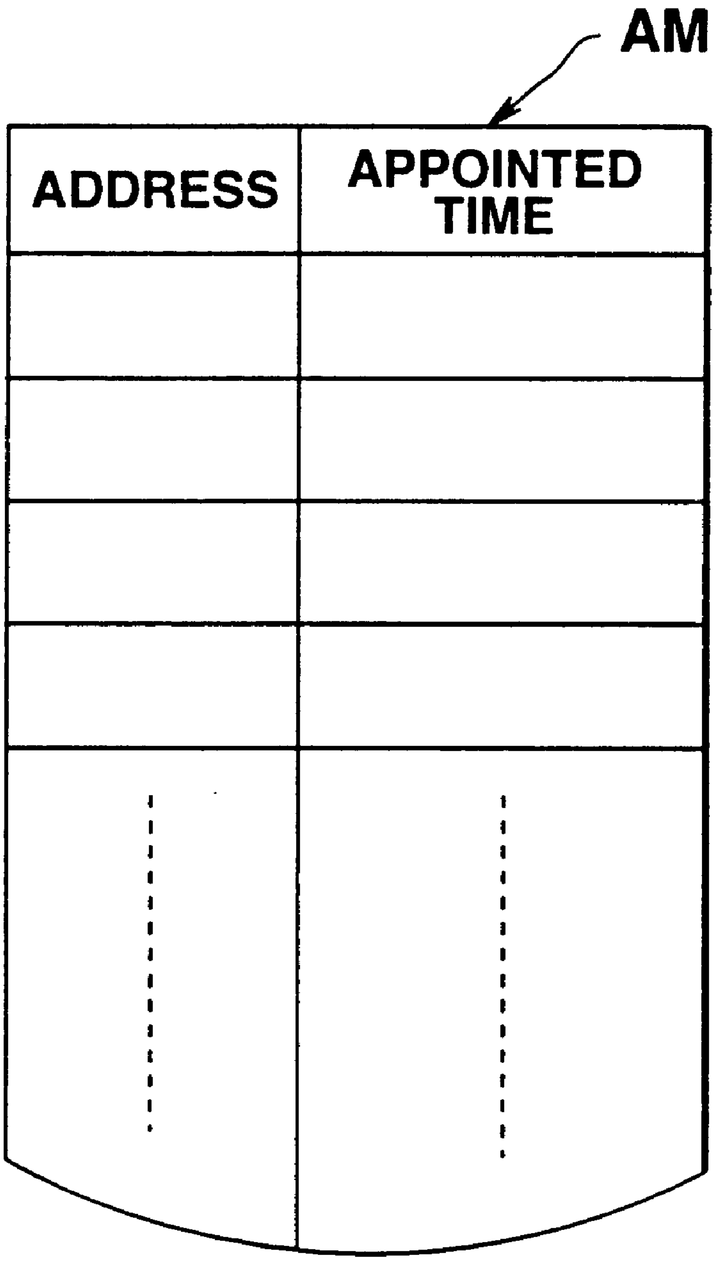
FIG. 8 shows the memory structure of the alarm memory AM in the RAM 17 shown in FIG. 5.

The TEL bank memory TB shown in FIG. 5, stores a name, a telephone number, a pager number and, a type of sound (melody) for use when a message is received in such a manner that they correspond to each other, as shown in FIG. 7. The alarm memory AM shown in FIG. 5 stores an address corresponding to the address stored of the message memory MM for storing the received message data and received 4-digit dial data, which is the limited number of digits, following the display control code "10011101" (dial data "9*4") while making them to correspond to an appointed time, as shown in FIG. 8.

Figure 9:
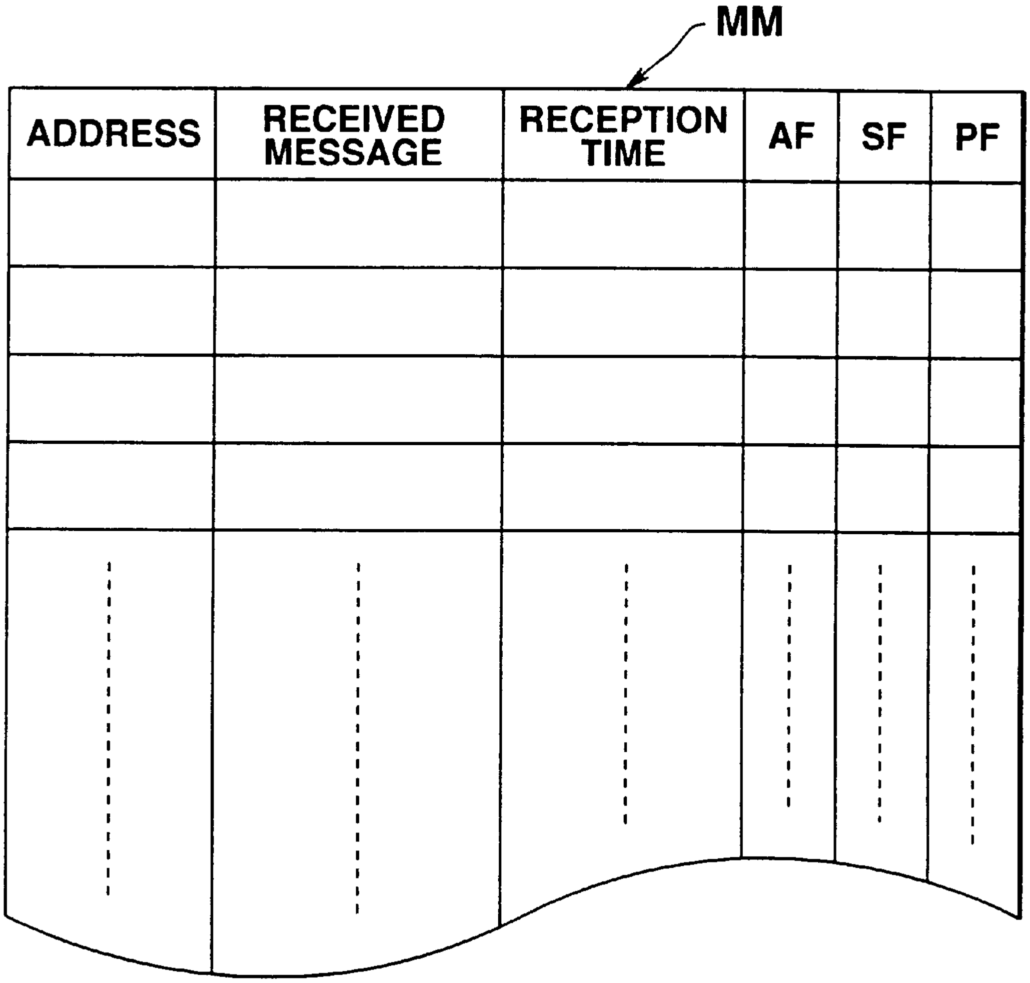
FIG. 9 shows the memory structure of the message memory MM in the RAM 17 shown in FIG. 5.

The message memory MM shown in FIG. 5 stores an address, a received message data, a reception time, an alarm flag AF for setting a flag until an appointed time in a case where a display control code "10011101" (dial data "9*4") is instructed, a secret flag SF for setting a flag until a user of the pager 1 inputs a password and therefore "secret" is suspended in a case where a secret message is received, and a protect flag PF for setting a flag for inhibiting suspension of the secret function in such a manner that the flags are made to correspond to one another, as shown in FIG. 9.

The ROM (Read Only Memory) 18 stores the message data reception process program and various control programs which are performed by the CPU 15 and stores a fixed form message table shown in FIG. 10 for making message numbers and fixed form message s to correspond to one another.

Figure 11:
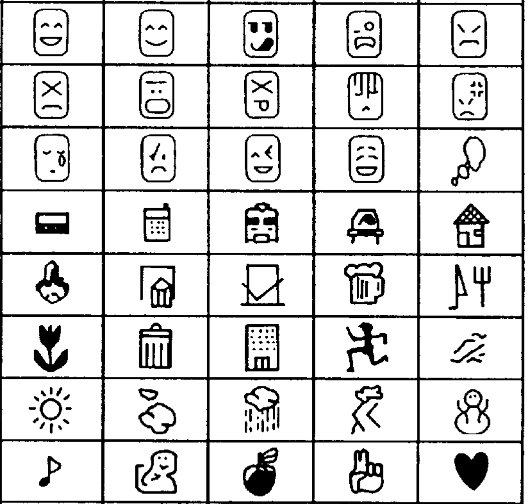
FIG. 11 shows a free word conversion matrix table which is stored in the free word memory 19 shown in FIG. 4.

The free word memory 19, as shown in FIG. 11, stores a free word conversion matrix table in the form of a matrix of 10 rows×15 columns. A character called a free word is read out in accordance with the combination of 4-bit bit patterns following a free word start symbol "11001100" which is dial data "*2*2" included in the message. If the combination is "00010011", alphabet "D" is read out. If the combination is "10000110", symbol "=" is read out. A portion indicated by "A" shown in FIG. 11 stores ten types of display control codes. In a case where the display control code is included in the received message, the CPU 15 performs display control based on the received message in accordance with the contents of control of the display control table shown in FIGS. 12A and 12B and stored in the display control memory shown in FIG. 4.

As shown in FIGS. 12A and 12B, the display control code table includes a name of control, contents of control, and a number of digits of the dial data following the display control code for each of "DCC1" to "DCC10" shown in FIG. 11 and corresponding to ten types of display control codes defined as 8-bit bit patterns "10001100" to "10001111", "10001011", "10011100" to "10011111", and "10011011".

The LED driver 20 operates the LED 21 in accordance with a control signal supplied from the CPU 15 when message reception notification is performed so that the LED 21 flashes to inform the user of paging.

The speaker driver 22 drives the speaker 23 with digital data which is supplied from the CPU 15 when message reception notification is performed so that the speaker 23 outputs a predetermined melody to notify reception of a message.

The vibrator driver 24 vibrates the vibrator 25 in accordance with a control signal supplied from the CPU 15 when message reception is notified.

The display buffer 26 provides a memory area for temporarily storing display data of a received message generated from the message data supplied from the CPU 15 or display data of the instructed contents on the basis of the contents of key input. Stored display data of the received message are sequentially transferred to the display 27 under control of the CPU 15.

The display 27 comprises the matrix type liquid crystal display panel shown in FIG. 3 to display a message on the basis of display data of the received message sequentially supplied from the display buffer 26 or instructed display data on the basis of the key input.

The operation of this embodiment will now be described.

Figure 13:
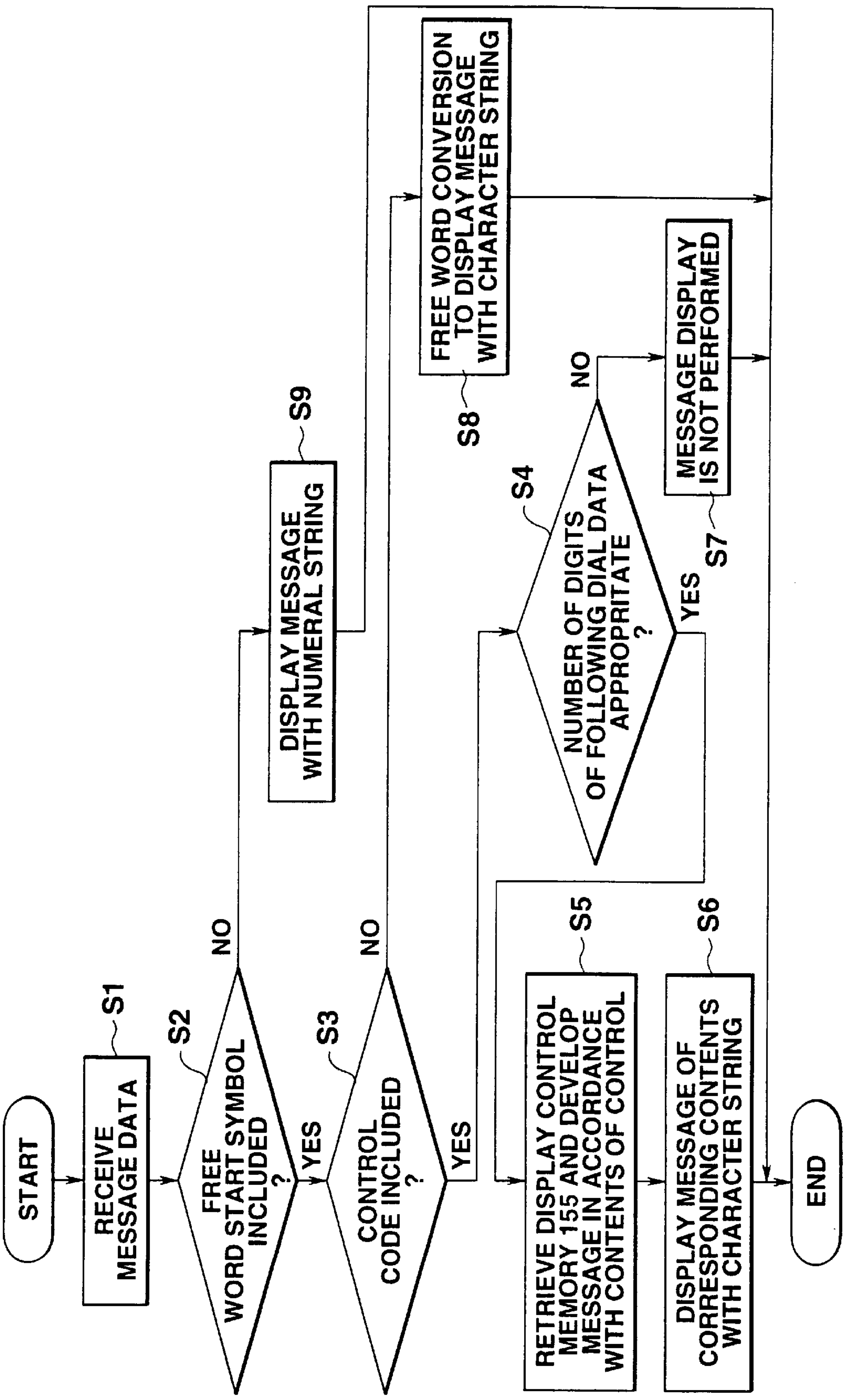
FIG. 13 is a flow chart showing a message receiving process which is performed by the pager 1 shown in FIG. 4.

First, the process for receiving the message data which is performed by an operation of the CPU 15 for controlling the pager 1 shown in FIG. 4 will now be described with reference to a flow chart shown in FIG. 13.

If it is detected by the decoder 13 that address data included in the ID code of a radio signal received through the antenna 11 and the RF receiver 12 and own address data coincide with each other, a coincidence detection signal is supplied to the CPU 15. If existence of the message data is detected, the CPU 15 controls the decoder 13 and the RF receiver 12 to continue reception of the data. Then, the message data which is decoded by the decoder 13 is fetched (step S1). Then, it is detected whether a free word start symbol "11001100" (dial data "*2*2") is included in the message data (step S2).

In a case where the free word start symbol is included, the CPU 15 causes the control code detector 151 to detect whether a control code is included in even digits in the dial data following the free word start symbol (step S3). In a case where the control code is included, a display control code is generated from the control code and the 4-bit pattern in front of the control code. It is detected whether or not the number of digits of the dial data corresponding to the display bit pattern following the control code is appropriate (step S4). That is, the digit detector 152 reads out the generated display control data and corresponding limited number of digits of dial data from the display control memory 155 and detects whether the digit of the dial data following the generated display control code is appropriate with respect to the limited number of digits. If it is detected that the number of digits of the dial data is appropriate, the contents of control corresponding to the generated display control code is, in step S3, read from the display control table in the display control memory shown in FIGS. 12A and 12B. In accordance with the read contents of control, the fetched message is developed on the display buffer 26 (step S5).

The contents of display of the received message developed on the display buffer 26 is displayed on the display 27 in accordance with the contents of control. Moreover, the LED 21, the speaker 23, or the vibrator 25 is operated (step S6) so that this process is completed.

If it is detected in step S4 that the number of digits of dial data following the generated display control code is not appropriate, the fetched received message is not displayed (step S7) and this process is completed.

If it is detected that a control code following the free word start symbol is not included in step S3, bit pattern data items following the free word start symbol are sequentially converted into free words in accordance with the free word conversion matrix table shown in FIG. 11. The free word obtained by conversion is developed on the display buffer 26 so that the received message in the form of a string of characters is displayed on the display 27. Moreover, the LED 21, the speaker 23, or the vibrator 25 is operated (step S8) so that this process is completed.

If the free word start symbol is not included in the fetched the message data in step S2, the dial number directly set by the character generator from 4-bit pattern data in accordance with the conversion table shown in FIG. 2 are developed on the display buffer 26 so that the received message is displayed on the display 27. Moreover, the LED 21, the speaker 23, or the vibrator 25 is operated (step S9) and this process is completed.

Examples of display of the received messages each of which is displayed on the display 27 in a case where the control code shown in the display control table of FIGS. 12A and 12B is included in the message data as a result of the message data reception process will now be described together with the structure of data of the received message.

Figure 14:
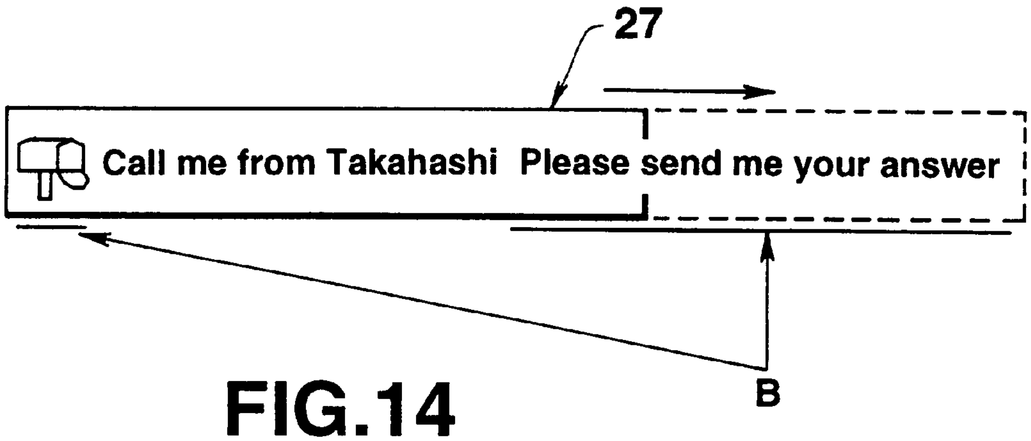
FIG. 14 shows an example of display of a received message in a case where an instruction of reply is instructed with control code "10001100" (dial data "8*2") shown in FIGS. 12A and 12B.

An example of display of a received message in a case where an instruction of reply of control name corresponding to a display control code "10001100" (dial data "8*2") shown in the display control table of FIGS. 12A and 12B is instructed with the message data is shown in FIG. 14.

Although the form of the message data is in the form of a 4-bit bit pattern corresponding to the inputted dial data, the description will be made such that the message data is expressed by dial data inputted by the data sender to simply perform description.

FIG. 14 shows an example of display of a received message in a case where the message received by the pager 1 is "*2*28*2*4*402*2*24557545236294050404740584-748".

If the CPU 15 detects that the message data includes the free word start symbol "*2*2" and if the control code detector 151 detects existence of the control code "*2" at the fourth digit, a display control code "9*2" is generated by placing the dial data "9" in front of "*2". As a result, an instructed illustration is read out from the free word conversion matrix table shown in FIG. 11 in accordance with the contents of the control name "instruction of reply" in the display control table shown in FIGS. 12A and 12B, and then developed on the display buffer 26. Then, a fixed form message start symbol "4*4" and following 2-digit dial data "02" are detected so that the corresponding contents "Call me" having the message number "02" is read from the fixed form message table shown in FIG. 10 and developed on the display buffer 26.

When the free word start symbol "*2*2" is detected illustration, dial data "4557545236294050404740584748" is converted into a free word in accordance with the free word conversion matrix table shown in FIG. 11 so that "from Takahashi" is then developed on the display buffer 26. Finally, a fixed form message "Please send me your answer" on the basis of the contents of control is developed on the display buffer 26.

As a result of the process for converting into the received message, message "(illustration of a mail box) Call me from Takahashi Please send me your answer" in which the illustration of the mail box and the fixed form message are developed at the front portion "B" and the rear portion "B" shown in FIG. 14 are developed is displayed on the display 27.

When the message developed on the display buffer 26 is displayed on the display 27, the number of digits of the displayed characters of the received message is larger than the display range. Therefore, the displayed message is scrolled in a direction indicated by an arrow shown in FIG. 14. When the suspension key 162 of the key input device 16 is operated, the scroll-display of the message is interrupted. The scroll display of the message is restarted when the cursor key 163 is operated.

As shown in FIG. 11, the illustration code definition frame and display code definition frame "A" are expanded in the free word conversion matrix table which is stored in the free word memory 19 of the pager 1. Therefore, data including an illustration code for displaying a simple illustration in the free word data and a display control code for specifying display and form of the message is transmitted by merely inputting 2-digit dial data similarly to the conventional instruction of the free word. Thus, the input operation of the data sender can be simplified.

Further, since the illustration code definition frame and display code definition frame "A" are expanded in the free word conversion matrix table which is stored in the free word memory 19 of the pager 1, the fixed form message is displayed together with illustration in a case where the display control code "8*2" is included in the message data as shown in FIG. 14. Therefore, the display control code enables a linked display of the fixed form message and the message display by the free word can easily be performed.

Figure 15:
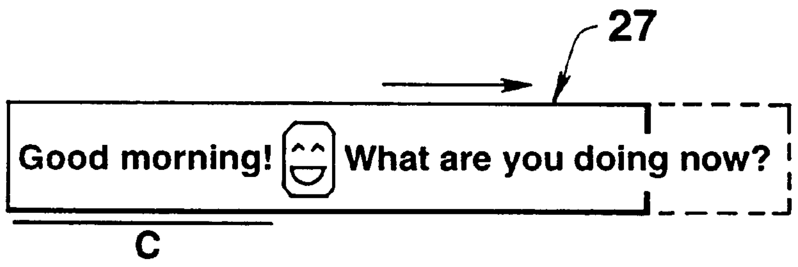
FIG. 15 shows an example of display of a received message in a case where display of greeting phrase is instructed with display control code "10001101" (dial data "8*4") shown in FIGS. 12A and 12B.

An example of display of a received message in a case where the CPU 15 instructs the control name "display of greeting phrase" corresponding to the display control code "8*4" shown in the display control table of FIGS. 12A and 12B is shown in FIG. 15.

FIG. 15 shows an example of display in a case where the message data received by the pager 1 is "*2*28*40*23247405936405744366454603643544853463653546288".

First, the CPU 15 detects that the free word start symbol "*2*2" is included in the message data. Then, the contents of control having the control name "display of greeting phrase" in the display control table shown in FIGS. 12A and 12B is read by using the display control code "8*4". If the message reception time zone is "4:00 to 10:00", for example, at the front portion "C" as shown in FIG. 15, the greeting phrase "Good morning!" corresponding to the time zone is developed on the display buffer 26.

Then, dial data "0*232474059364057443664 54 . . . " is converted into the free word in accordance with the free word conversion matrix table shown in FIG. 11. Thus, an illustration specified by "0*2" and a message "What are you doing now?" are developed on the display buffer 26.

As a result of the process for developing the message data, a received message "Good morning! (an illustration specified by "0*2") What are you doing now?" is scrolled on the display 27, as shown in FIG. 15.

Also in this case, the suspension key 162 and the cursor key 163 can be operated to interrupt and restart the scroll display of the received message, similarly to the case shown in FIG. 14.

Since the illustration code definition frame and the display control code definition frame "A" in the free word conversion matrix table which is stored in the free word memory 19 of the pager 1 are enlarged, display of greeting phrase as a time message corresponding to the reception time zone can be easily performed in a case where the display control code "8*4" is included in the message data, as shown in FIG. 15. The message sender is able to save labor to input dial data for transmitting the message data corresponding to the greeting phrase and an amount of data to be transmitted can be reduced. Moreover, an expressive message data including the illustration data or the like can be transmitted to the pager of the third party so as to be displayed, as shown in FIG. 15.

Figure 16:
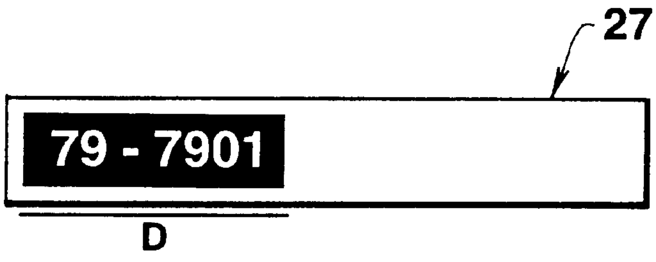
FIG. 16 shows an example of display of a received message in a case where reversed-display is instructed with display control code "10001110" (dial data "8*6") shown in FIGS. 12A and 12B.

An example of display of a received message is shown in FIG. 16 in a case where the control name "reverse display" corresponding to the display control code "8*6" in the display control table shown in FIGS. 12A and 12B is instructed.

FIG. 16 shows an example of display in a case where the message data received by the pager 1 is "*2*28*6*879*27901".

First, the CPU 15 detects that the free word start symbol "*2*2" is included in the message data, and that the display control code "8*6" is the control name "reverse display" of the display control table shown in FIGS. 12A and 12B. After, the free word completion symbol "*8" is detected, and then the following dial data "79-(*2)7901" is developed on the display buffer 26.

In accordance with the contents of control, that is, reverse display, the received message "79-7901" is reversely displayed on the display 27 as indicated by an underline "D" of FIG. 16.

Since the illustration code definition frame and the display control code definition frame "A" in the free word conversion matrix table which is stored in the free word memory 19 in the pager 1 are expanded, the message can be reversely displayed as shown in FIG. 16 in a case where the display control code "8*6" is included in the message data. If the data sender uses the reverse display when an important message or the like is transmitted, the data receiving person is caused to pay attention to the message attributable to the reverse display. Thus, the form of display of the received message can be easily varied.

Figure 17:
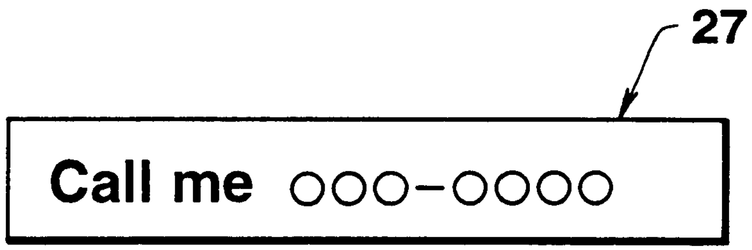
FIG. 17 shows an example of display of a received message in a case where an urgent message is instructed with display control code "10001111" (dial data "8*8") shown in FIGS. 12A and 12B.

An example of display of a received message in a case where the control name is "urgent message" corresponding to the display control code "8*8" shown in the display control table shown in FIGS. 12A and 12B is shown in FIG. 17.

FIG. 17 shows an example of a received message in a case where the message data received by the pager 1 is "*2*28*8*8000*20000"("0" is dial number).

First, the CPU 15 detects that the free word start symbol "*2*2" is included in the message data. Then, it is detected that the control name is "urgent message" in the display control table shown in FIGS. 12A and 12B by using the display control code "8*8". After, the free word completion symbol "*8" is detected, the following dial data "000-(*2) 0000" (arbitrary dial data) is first developed on the display buffer 26.

In accordance with the urgent message (notification by using the speaker and operation of the vibrator are alternately performed together with display), which is the contents of control, the display 27 displays "Call me 000-0000", as shown in FIG. 17. At the same time, sound notification using the speaker 23 and vibration notification using the vibrator 25 are performed alternately.

Since the illustration code definition frame and the display control code definition frame "A" in the free word conversion matrix table which is stored in the free word memory 19 in the pager 1 are expended, notification with vibration and that with sound can be performed as well as the display of the received message as shown in FIG. 17 in a case where the display control code "8*8" is included in the message data. The data sender is required to input only two-digit dial data similarly to conventional free word data to easily instruct the contents of control.

Figure 18:
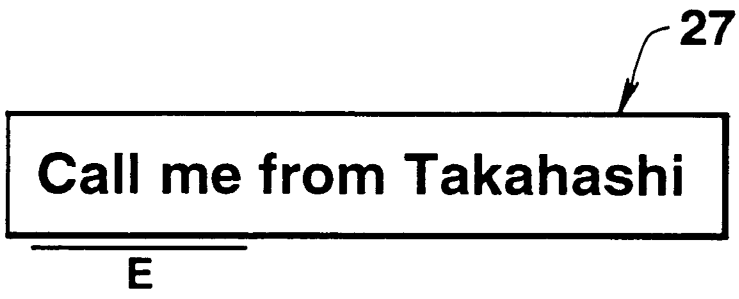
FIG. 18 shows an example of display of a received message in a case where display of a fixed form message is instructed with display control code "10001011" (dial data "8*0") shown in FIGS. 12A and 12B.

An example of display of a received message in a case where the fixed form message display "8*0" shown in the display control table shown in FIGS. 12A and 12B is instructed is shown in FIG. 18.

FIG. 18 shows an example of display of a received message in a case where the message data received by the pager 1 is "*2*28*00245575452362940504047405847 48".

First, it is detected that the free word start symbol "*2*2" is included in the message data and that the display control code "8*0" is the control name "fixed form message display" of the display control table shown in FIGS. 12A and 12B by using the display control code "8*0". The 2-digit dial data "02" following the display control code is used to read "Call me" corresponding to the message number "02" from the fixed form message table shown in FIG. 10. The read data is developed on the display buffer 26. Then dial data "454754 . . . ." is converted into a free word in accordance with the free word conversion matrix table shown in FIG. 11 so that "From Takahashi" is developed on the display buffer 26.

As a result of the process of converting into the received message, received message "Call me from Takahashi" in which a fixed form message is developed in the front portion E as shown in FIG. 18, is displayed on the display 27.

As described above, the illustration code definition frame and the display control code definition frame "A" in the free word conversion matrix table which is stored in the free word memory 19 in the pager 1 are expanded. Therefore, in a case where the control code "8*0" is included in the message data, a fixed form message can be instructed and displayed following the free word as shown in FIG. 18. Thus, the data sender is able to save labor for inputting the free word completion symbol "*8" and the fixed form message start symbol "*4*4" and reduce the number of digits of dial data to be transmitted.

Figure 19:
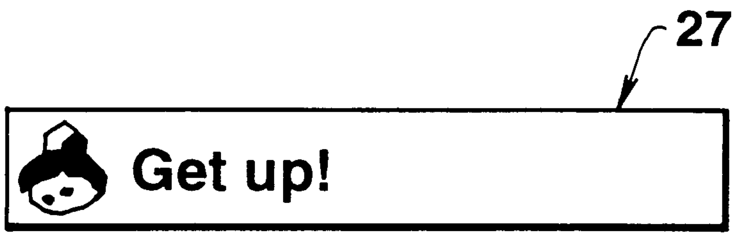
FIG. 19 shows an example of display of a received message in a case where alarm memo is instructed with display control code "10011100" (dial data "9*2") shown in FIGS. 12A and 12B.

An example of display of a received message in a case where the control name "alarm memo" corresponding to the display control data "9*2" shown in the display control table shown in FIGS. 12A and 12B is instructed is shown in FIG. 19.

FIG. 19 shows an example of display of a received message in a case where the message data received by the pager 1 is "*2*24*2164459366055709*20700".

First, it is detected that the free word start symbol "*2*2" is included in the message data. The dial data "4*216445936605570" is converted into "(an illustration of "4*2") Get up!" in accordance with the free word conversion matrix table shown in FIG. 11.

When it is detected that the control name of the display control code is "alarm memory" in the display control table shown in FIGS. 12A and 12B by using the following display control code "9*2", the received message "(an illustration of "4*2") Get up!" is developed on the display buffer 26 at time "7:00" instructed with 4-digit dial data "0700" following the display control code. The contents of the display buffer 26 is displayed on the display 27. Moreover, a predetermined sound type melody is used to notify the receipt of the message with sound.

As described above, the illustration code definition frame and the display control code definition frame "A" in the free word conversion matrix table which is stored in the free word memory 19 in the pager 1 are developed. Therefore, in a case where the notification control code "9*2" is included in the message data, the data sender is able to cause the received message to be display on the pager 1 at the time instructed with the 4-digit dial data as shown in FIG. 19. Thus, in a case where data must be transmitted at appointed time, the load for the data sender can be reduced.

Figure 20:
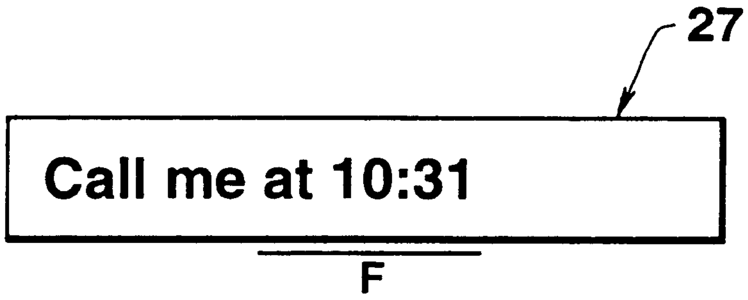
FIG. 20 shows an example of display of a received message in a case where display of appointed time is instructed with display control code "10011101" (dial data "9*4") shown in FIGS. 12A and 12B.

An example of display of a received message in a case where control name "display of appointed time" corresponding to display control code "9*4" shown in the display control table shown in FIGS. 12A and 12B is instructed is shown in FIG. 20.

FIG. 20 shows an example of display of a received message in a case where the message data received by the pager 1 is "*2*28*0029*41031".

It is detected that the free word start symbol "*2*2" is included in the message data. The display control code "8*0" is used to detect that the control name is "display of fixed form message" in the display control table shown in FIGS. 12A and 12B. Then, 2-digit dial data "02" is used to read contents "Call me" from the fixed form message table shown in FIG. 10 so as to be developed on the display buffer 26. Then, it is detected that the control data "9*4" denotes the control name "display of appointed time" in the display control table shown in FIGS. 12A and 12B. It is detected that the following 4-digit dial data "1031" denotes an appointed time data. The message "at 10-31" is developed on the display buffer 26.

As a result of the process for conversion into the received message, a received message "Call me at 10-31" in which the appointed time is developed in the front portion F as shown in FIG. 20 is displayed on the display 27.

The illustration code definition frame and the display control code definition frame "A" in the free word conversion matrix table which is stored in the free word memory 19 in the pager 1 are expanded. As a result, in a case where the display control code "9*4" is included in the message data as shown in FIG. 20, 4-digit dial data following the display control code "9*4" is considered as appointed time data so that "at" and "-(hyphen)" are automatically added so as to be displayed. Therefore, the data sender is able to save labor for inputting dial data to instruct "at" and "-(hyphen)" can be saved and the number of digits of dial data can be reduced.

Figure 21:
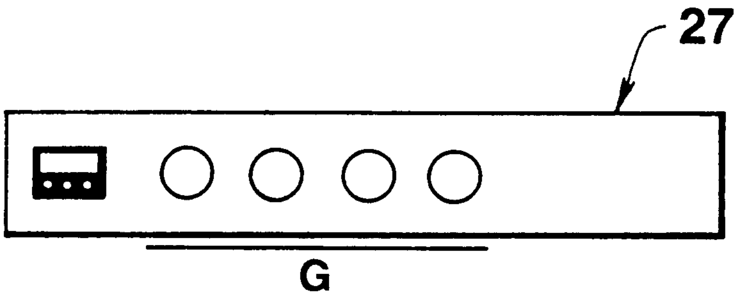
FIG. 21 shows an example of display of a received message in a case where reversed-display is instructed with display control code "10011110" (dial data "9*6") shown in FIGS. 12A and 12B.

An example of display of a received message in a case where control name "display of name of sender" corresponding to display control code "9*6" shown in the display control table shown in FIGS. 12A and 12B is shown in FIG. 21.

FIG. 21 shows an example of display of a received message in a case where the message data received by the pager 1 is "*2*23*29*61111". First, the CPU 15 detects that the free word start symbol "*2*2" is included in the message data. Then, 2-digit dial data "3*2" is converted into free word in accordance with the free word conversion matrix table shown in FIG. 11 so that illustration of "3*2" is first developed on the display buffer 26. Then, the following control code "9*6" is used to detect the control code "display of name of sender" in the display control table shown in FIGS. 12A and 12B.

Then, following 4-digit dial data "1111" and dial data of last four digits in the telephone number data area stored in the TEL bank memory TB shown in FIG. 7 are compared with each other. Then, name data corresponding to the dial data of the coincident last four digits is read so as to be developed on the display buffer 26.

As a result of the process for conversion to the received message, a received message "(an illustration of "3*2") 0000" in which read name data (name of the sender) is developed in the rear portion G as shown in FIG. 21 on the display 27 with a corresponding melody.

The illustration code definition frame and the display control code definition frame "A" in the free word conversion matrix table which is stored in the free word memory 19 in the pager 1 are expanded. Therefore, in a case where display control code "9*6" is included in the message data as shown in FIG. 21, name data previously registered into the pager 1 can be displayed as name of the sender with 4-digit dial data following the display control code "9*6". Therefore, the data sender is able to save labor for inputting own name with dial data. Moreover, an amount of data which must be transmitted can be reduced.

Figure 22:
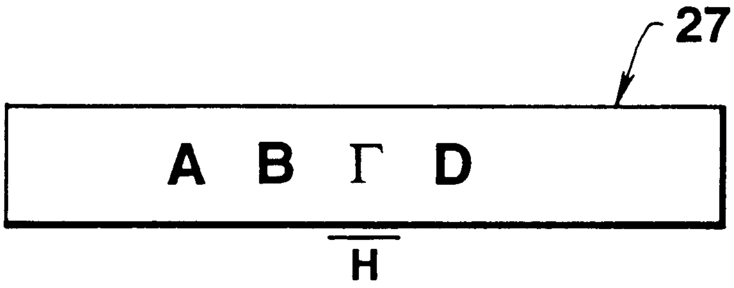
FIG. 22 shows an example of display of a received message in a case where display of a Greek character is instructed with display control code "10011111" (dial data "9*8") shown in FIGS. 12A and 12B.

An example of display in a case where control name "display of Greek character" corresponding to the display control code "9*8" shown in the display control table shown in FIGS. 12A and 12B is instructed is shown in FIG. 22.

FIG. 22 shows an example of display of a received message in a case where the message data received by the pager 1 is "*2*211129*81314".

It is detected that the free word start symbol "*2*2" is included in the message data. Then, dial data "1112" is converted into a free word in accordance with the free word conversion matrix table shown in FIG. 11 so that "AB" is first developed on the display buffer 26.

Then, the following display control code "9*8" is used to detect control name "display of Greek character" in the display control table shown in FIGS. 12A and 12B.

A Greek character "Γ" is generated from character generator 160 corresponding to the display control code and a 2-digit dial data "13" followed a free word "C" in the free word conversion matrix table shown in FIG. 11, because the Greek character "Γ" is defined as a third character of a Greek alphabet character set. Thus, the Greek character "Γ" is developed on the display buffer 26.

Then, following 2-digit dial data "14" is converted into a free word in accordance with the free word conversion matrix table shown in FIG. 11 so that a capital character "D" is finally developed on the display buffer 26.

As a result of the process for conversion to the received message, received message "AB Γ D" in which Greek character "Γ" is developed in the underline portion H as shown in FIG. 22 is displayed on the display 27.

The illustration code definition frame and the display control code definition frame "A" in the free word conversion matrix table which is stored in the free word memory 19 in the pager 1 are developed. As a result, in a case where display control code "9*8" is included in the message data as shown in FIG. 22, a free word in the Greek alphabet character set instructed with 2-digit dial data following the display control code "9*8" is displayed. Therefore, the expression form of the received message can be varied on the pager 1.

Note that another display form which is not usually stored in the free word memory 19 in the pager 1 may be display in Russian characters and different fonts.

Figure 23:
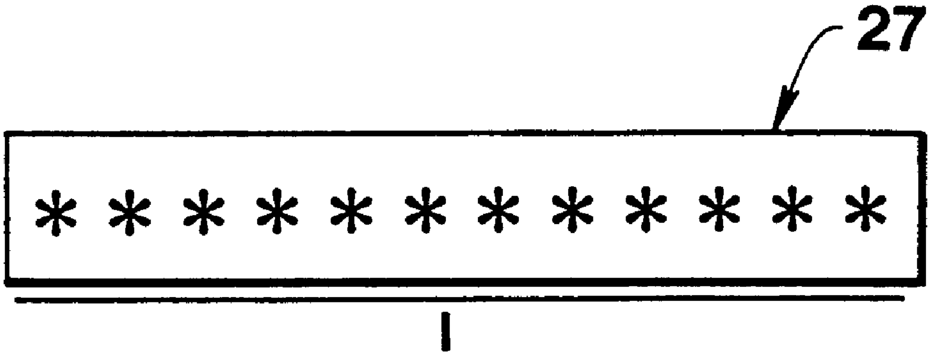
FIG. 23 shows an example of display of a received message in a case where secret message is instructed with display control code "10011011" (dial data "9*0") shown in FIGS. 12A and 12B.
Figure 24:
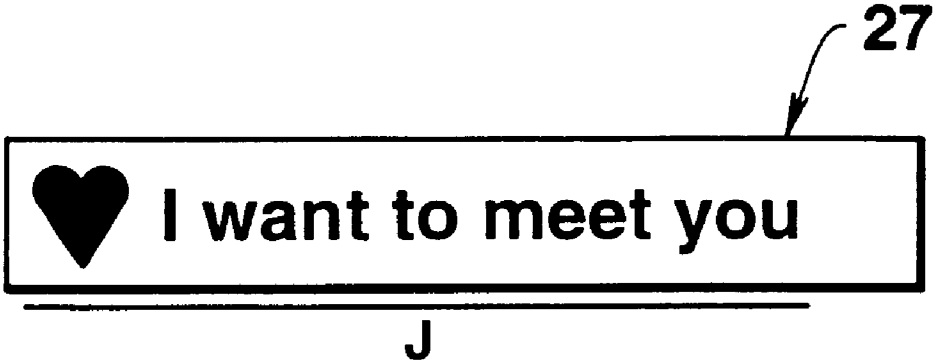
FIG. 24 shows a state where secret is suspended by inputting a password under display of FIG. 23.

An example of display of a received message in a case where control name "secret message" corresponding to display control code "9*0" shown in the display control table shown in FIGS. 12A and 12B is instructed is shown in FIGS. 23 and 24.

FIGS. 23 and 24 show an example of display in a case where the message data received by the pager 1 is "*2*29*07*018365244445936645460".

It is detected that the free word start symbol "*2*2" is included in the message data. Then, the following control code "9*0" is used to detect control name "secret message" in the display control table shown in FIGS. 12A and 12B. Then, dial data "7*01836 . . ." following the display control code is converted into a free word in accordance with the free word conversion matrix table shown in FIG. 11 so that "(an illustration of "7*0") I want to meet you" is converted. Since display control code "9*0" however exists, "***********" indicating that the received message is secret is displayed on the display 27 as indicated by underline I shown in FIG. 23. At this time, the message data is stored in the message memory MM shown in FIG. 9 in the transmission base station 5** and a protect flag PF is turned on.

When a password of a user of the pager 1 is inputted, the input password is comparison with a password previously registered and stored in the password memory PW in the RAM 17 shown in FIG. 6 is performed. If coincidence with the inputted password is detected, the protect flag PF is reset. Then, the message data in the message memory MM is used to display a received message "(an illustration of "7*0") I want to meet you" previously developed on the display buffer 26 is displayed on the display 27 as shown in FIG. 24.

The illustration code definition frame and the display control code definition frame "A" in the free word conversion matrix table which is stored in the free word memory 19 in the pager 1 are expanded. As a result, in a case where the display control code "9*0" is included in the message data, the received message can be made to be secret message as shown in FIG. 23. Moreover, when a password previously registered is inputted by a user of the pager 1, secret is suspended so that the received message is displayed as shown in FIG. 24.

As a result, the data sender is required to input the display control code "9*0" following the free word start symbol "*2*2" to transmit a secret message.

Second Embodiment

Although the first embodiment enables simple illustration and control of notification of a received message can be instructed when a data sender 6 dials control codes "*0", "*2", "*4", "*6", and "*8" as well as the capital letters, small letters, and symbols, a set of alphanumeric characters shown in FIG. 32 can directly be set by changing the contents of the free word conversion matrix in the present invention.

FIG. 25 shows a modification of a free word conversion matrix which is stored in the free word memory 19 of the pager 1 according to the second embodiment.

The matrix stores all of 128 characters (including 32 control characters) in the alphanumeric character set shown in FIG. 32 and which can be instructed with 7-bit data while making 128 characters to correspond to a combination of 4-bit bit patterns, the input of which can be instructed by a dialing operation.

The control character set to correspond to characters which are used in respective nations are stored in the display control code area so as to easily be distinguished from characters which are used usually when the dialing operation is performed.

That is, when the data sender 6 instructs dial data "0*2" as the display control code (Display Control Code), the pager 1 receives "00001100" as the combination of bit patterns so that the control characters "NUL" are instructed as free word data. When dial data "4*6" is instructed, the pager 1 receives "01001110" as a combination of bit patterns so that control characters "DC3" is instructed as free word data.

Display control data according to the first embodiment can also be instructed similarly.

Third Embodiment

The first and second embodiments have the structure such that the control code detector 151 detects bit patterns "1011 (*0)", "1100(*2)", "1101(*4)", "1110(*6)", and "1111(*8)" in the even digits of the free word data (dial data). Then, bit patterns in front of the foregoing bit patterns so that display control codes are generated from a set of the bit patterns and the display control code. However, the push dial "*" may be omitted and 10 types of ten keys may be used to instruct 100 or more types of free words.

An embodiment of this case will now be described. Note that the same elements as those of the first embodiment are omitted from description.

Figure 26:
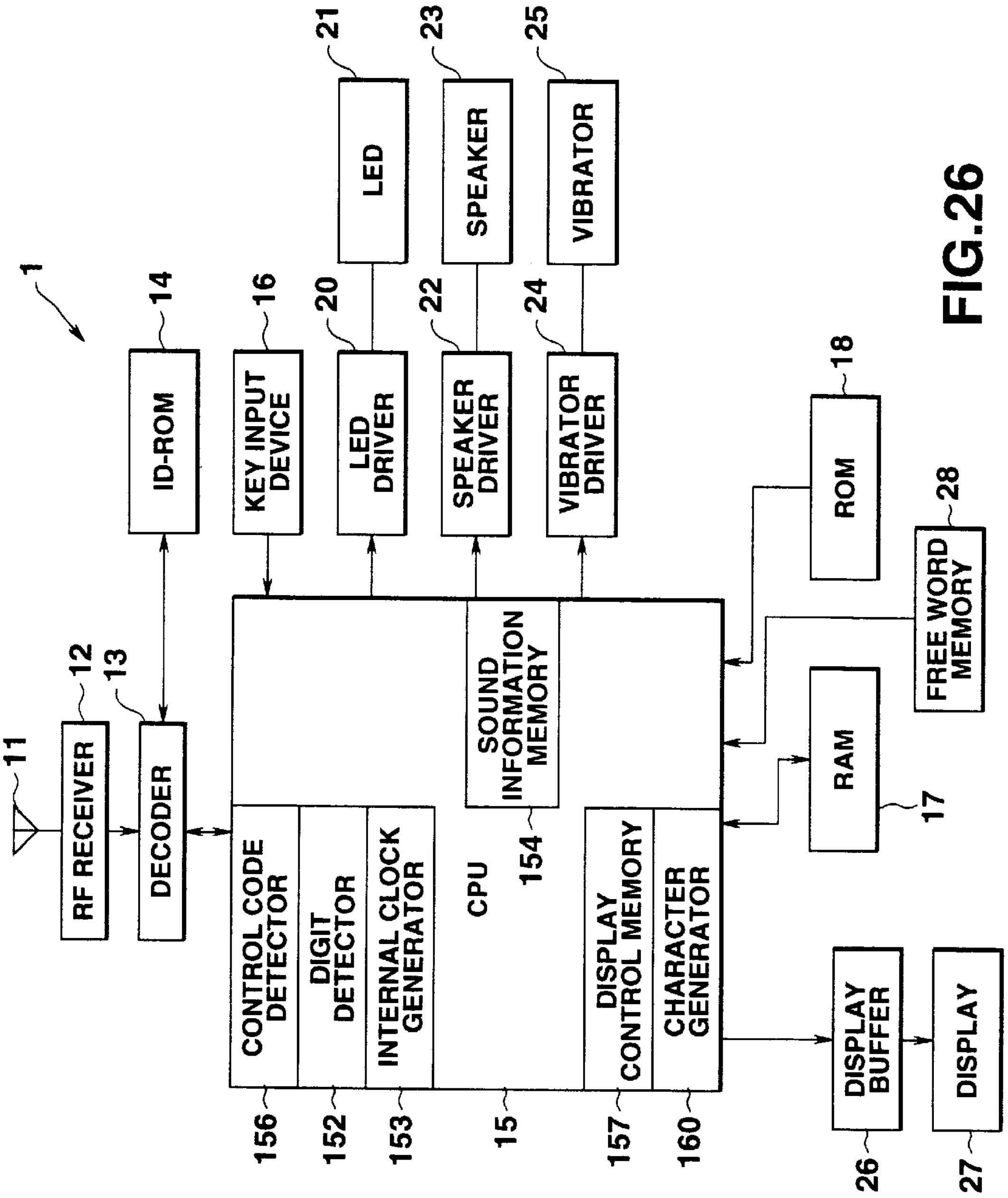
FIG. 26 is a block circuit diagram according to a third embodiment which is provided in the pager 1 shown in FIG. 3.

FIG. 26 shows a block circuit diagram of the pager 1 according to the third embodiment. The CPU 15 comprises a control code detector 156 for detecting a control code instructed with a 8-bit bit pattern "10011001" (dial data "99") among the received message data, and a display control memory 157 for storing the contents of control in the display control table shown in FIGS. 27A and 27B correspondingly to the generated display control code.

When the CPU 15 detects the free word start symbol "11001100" (dial data "*2*2") in the message data supplied from the decoder 13 in the process for receiving the message data, and if a control code "10011001" is included in the free word data of the message data detected by the control code detector 156, a bit pattern corresponding to two digits of dial data following the control code "10011001" and the control code "10011001" are used to generate a display control code. Then, whether the number of digits corresponding to the bit pattern following the display control code is appropriate with respect to the limited number of digits is detected. Then, the contents of control corresponding to the display control code are read from the display control table shown in FIGS. 27A and 27B and included in the display control memory 157.

Figure 28:
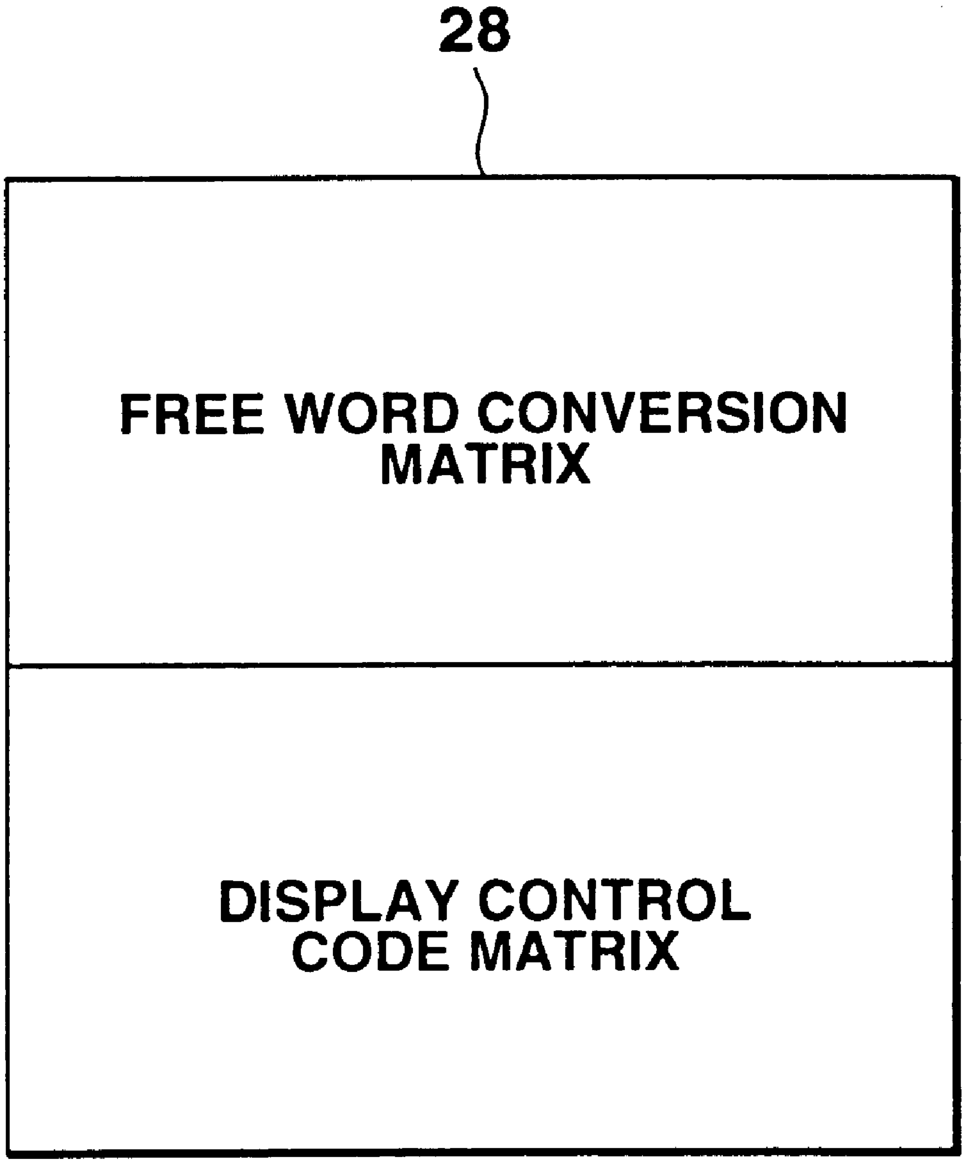
FIG. 28 shows a storage region of a free word conversion matrix table and a display control code matrix table which are stored in the free word memory 28 shown in FIG. 26.

The free word memory 28, as shown in FIG. 28, comprises a memory area for storing the free word conversion matrix and a memory area for storing display control code matrix.

The free word conversion matrix, as shown in FIG. 29, comprises 10 rows×10 columns. When a combination of bit patterns, for example "00010010" (dial data "12") is detected, character "B" is instructed. When a combination of bit patterns "01000110" (dial data "46") is detected, character "g" is instructed. "DCCM" instructed with a 8-bit bit pattern "10011001" of the illustrated bit patterns means instruction of an illustration, a control character, and the contents of control which are stored in the display control code matrix.

Figure 30:
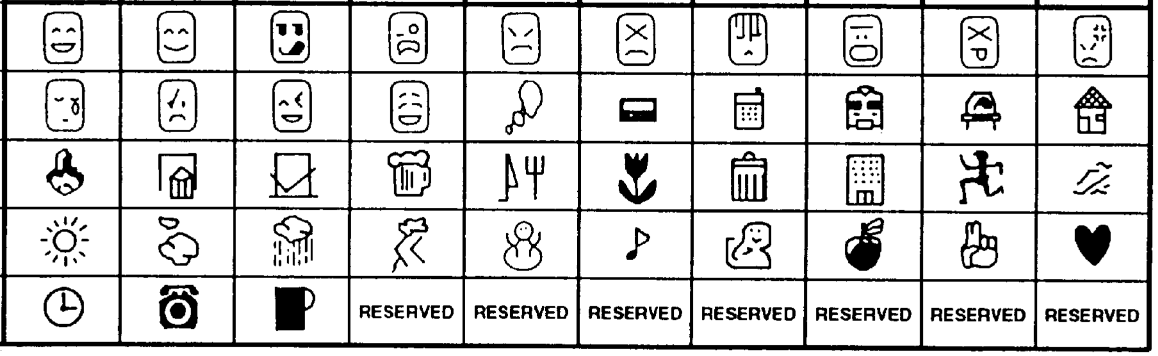
FIG. 30 shows a display control code matrix table which is stored in the free word memory 28 shown in FIG. 26.
Figure 31:
FIG. 31 shows a free word conversion table conforming to RCR STD-43.

The display control code matrix table, as shown in FIG. 30 is composed of 10 rows×10 columns. When a combination of bit patterns, for example, "1001100100010010" (dial data "9912") is detected, control character "VT" is instructed. When a combination of bit patterns "1001100101000110" (dial data "9946") is detected, "DCC7", that is, control name "display of appointed time" in the display control table shown in FIGS. 27A and 27B is instructed.

With the foregoing structure, when the pager 1 has received a bit pattern string corresponding to dial data "*2*2996599471111" supplied by the data sender 6 as the message data, the CPU 15 detects that free word start symbol "11001100" is included in the message data. Then, "1001100101100101" (dial data "9965") is generated as the display control code and is converted into a free word in accordance with the display control matrix table shown in FIG. 30 so that "(an illustration of "9965")" is developed on the display buffer.

Then, it is detected that "1001100101000111" (dial data "9947") is the display control code. Then, the control name "display of name of sender" is detected in accordance with the display control matrix table shown in FIG. 30. Dial data "1111" reproduced from the following bit pattern string and dial data of the last four digits in the telephone number data stored in the TEL bank memory TB shown in FIG. 7 are collated with each other. Then, name data corresponding to the coincident last 4-digit dial data is read so as to be developed on the display buffer 26.

That is, an example of display of the received message with the message data above is as shown in FIG. 21.

Note that the display control table according to the foregoing embodiments is an example and a various modification may, of course, be permitted depending upon the agreement between the data sender, a user of the pager 1, and the service center 4.

Although the present invention is applied to the numerical pager (NP) in each of the foregoing embodiments, the present invention may be applied to a communication terminal (for example, a PDA(personal digital assistant) having a data receiving function or a Cellular phone having a message display function) capable of displaying characters.

INDUSTRIAL APPLICABILITY

One aspect of the present invention, a data receiver apparatus comprises:

receiving means for receiving a stream of data;

display means for displaying a message on the basis of the stream of data received by said receiving means;

first storage means for storing plural first data to be read out in accordance with a first predetermined combination of bit patterns included in the stream of data received by said receiving means and for specifying a first character displayed on said display means; and second storage means for storing plural second data in accordance with a second predetermined combination of bit patterns included in the stream of data received by said receiving means.

According to the aspect of the present invention, when the stream of data is received and a message according to the received data is displayed, character data is specified in accordance with a predetermined combination of bit patterns read out from the first receiving means so as to generate a message, and data except the character data is specified in accordance with a combination of bit patterns except the predetermined combination.

Therefore, the data receiver apparatus stores data specifying character in accordance with a predetermined combination of bit patterns and displays a message based on the character. When the data receiver apparatus detects a control code in response to a combination of bit patterns except the predetermined combination, it displays an illustration together with the message. Therefore, a data sender is only required to input dial data by operating dials by three times so that a free word including data for instructing display of the illustration is transmitted. The data receiver apparatus is able to simultaneously display the illustration and the free word. Therefore, the data input can easily be performed by the data sender.

By receiving a combination of bit patterns except the predetermined combination, the contents of display control with which a greeting phrase registered correspondingly to time zone of call reception can be displayed together with the received message. Therefore, labor for inputting the greeting phrase can be eliminated and an amount of data to be transmitted can be saved. As a result, the reduction in an amount of transmission data enables an exclusive message including illustration data or the like can be displayed on the called pager.

According to another aspect of the present invention, there is provided a data receiver apparatus receiving a stream of data and comprising display means for displaying a message in accordance with the stream of data received, the apparatus comprising:

storage means for storing plural character data read in correspondence with a predetermined combination of bit patterns; and control means for reading the bit patterns from the string of data received to combine the bit patterns and reading character data corresponding to the bit patterns from said storage means to generate a message, and controlling display of the generated message on said display means when a combination of bit patterns except the predetermined combination is detected.

According to the other aspect of the present invention, the data receiver apparatus receives a stream of data and displays a message in accordance with the received data. The data receiver apparatus stores plural character data to be read in accordance with a predetermined combination of bit patterns, reads character data in accordance with a bit pattern combination to generate a message, and displays the generated message when a combination of bit patterns except the predetermined combination is detected.

Therefore, when the data receiver apparatus detects a combination of bit patterns except the predetermined combination of bit patterns for specifying character data, control can be performed to reversely display character data in the received message. Thus, if a data sender uses this function in transmitting an important message or the like, the data sender can be caused to pay attention. Therefore, the expression form of a received message can be varied.

By receiving, for example, a bit pattern of dial data for specifying a fixed form message (so-called canned message) following the bit pattern as the contents of display control in accordance with the combination of bit patterns, a fixed form message can be displayed in the received message. Therefore, the data sender is able to save labor for inputting a symbol denoting start of a fixed form message and therefore an amount of data to be transmitted can be reduced.

In accordance with an employed combination of bit patterns, time, at which the received message is displayed, is instructed as the contents of display control by using dial data of four digits following the combination of the bit patterns. Thus, a string of the bit pattern corresponding to the received message can be displayed at the appointed time. In a case where the data sender must inform the destination of the call the message at the appointed time, labor in view of time schedule for the data sender can be reduced.

Moreover, an appointed time display function can easily be provided for a message receiver. In accordance with the combination of the bit patterns, dial data of four digits following a combination of bit patterns is, as the contents of display control, made to be time appointment data, which is displayed in a received message, "at", "-(hyphen)", and a corresponding bit pattern can be added and displayed in time appointment data. Therefore, the data sender is able to save labor for inputting dial for specifying "at" and "-(hyphen)".

As a result, an amount of data, which must be transmitted, can be reduced. In accordance with the combination of the bit patterns, for example, a bit pattern corresponding to dial data of four digits following a combination of the bit patterns is received so that a bit pattern corresponding to data sender registered previously in the data receiver apparatus is displayed. Therefore, the data sender is able to save labor required to input own name. Moreover, an amount of data which must be transmitted can be reduced.

In accordance with the combination of the bit patterns, a bit pattern corresponding to dial data of two digits following the combination of the bit patterns is received so that an instructed character is displayed in the form of a Greek character as the contents of display control. Therefore, expression of a received message can be varied.

In accordance with the combination of the bit patterns, for example, secret display with which the contents of a received message are not displayed can easily be realized, as the contents of display control. 5 Moreover, when a password, which is registered previously is input, the contents of the received message can be displayed. Therefore, the secret message function for the data receiver apparatus can easily be realized.

Moreover, in accordance with the combination of the bit patterns, display of the received message and the contents of information of supply of a message can be controlled as the contents of display control. Therefore, the data sender is required to only input dial data to control the contents of information. As a result, the data receiver apparatus is able to easily vary the form of informing the message during display of the received message.

What is claimed is:

1. A data receiver apparatus for receiving a stream of data, the apparatus comprising:

a display for displaying a message in accordance with the received stream of data;

a storage device for storing character data and display control data, the character data and the display control data respectively corresponding to predetermined combinations of bit patterns; and a controller for (i) extracting a combination of bit patterns from the received data stream, (ii) reading out the character data corresponding to the extracted combination of bit patterns when the extracted combination of bit patterns coincides with any one of the predetermined combinations of bit patterns corresponding to the character data and generating a message to be displayed based on the read out character data, (iii) reading out the display control data corresponding to the extracted combination of bit patterns when the extracted combination of bit patterns coincides with any one of the predetermined combinations of bit patterns corresponding to the display control data, and (iv) displaying the generated message on said display in accordance with the read display control data.

2. The data receiver apparatus according to claim 1, wherein said controller displays the generated message in reverse color on said display in accordance with the read display control data.

3. The data receiver apparatus according to claim 1, further comprising a time measuring circuit for measuring a present time, and wherein when said controller detects a time information following the combination of bit patterns corresponding to the display control data, said controller inhibits display of the generated message until the present time measured by said time measuring circuit coincides with said detected time.

4. The data receiver apparatus according to claim 1, further comprising:

a password storage device for storing passwords;

an input device for inputting passwords; and a message storage device for storing messages, and wherein when said controller detects a combination of bit patterns corresponding to the display control data, said controller stores the generated message into said message storage device, displays formatted contents on said display and, if a 10 password input from said password input device and the stored password coincide with each other, displays the message stored in said message storage device on said display.

5. The data receiver apparatus according to claim 1, further comprising informing means for informing a user of reception of the message, and wherein said controller displays the generated message on said display and causes said informing means to operate if a combination of bit patterns corresponding to the display control data is detected.

6. The data receiver apparatus according to claim 1, wherein said a controller inhibits display of the character data until a predetermined instruction is given.

7. The data receiver apparatus according to claim 4, wherein said controller enables display of the generated message on said display by embedding control data into the formatted contents.

8. The data receiver apparatus according to claim 1, further comprising a name storage device for storing names of senders and corresponding identification numbers for identifying the senders, and wherein when said controller detects the identification number following the combination of bit patterns corresponding to the display control data, said controller reads out the name of the sender corresponding to the identification number from said name storage device and displays the name of the sender on said display together with the generated message.

9. The data receiver apparatus according to claim 1, wherein said display control data comprises plural kinds of control data, and wherein one kind of display control data corresponding to the extracted bit pattern is read out.

10. The data receiver apparatus according to claim 1, wherein said predetermined combination of bit patterns is a combination of two 4-bit bit patterns.

11. A data receiver, apparatus for receiving a stream of data, comprising:

a display for displaying a message in accordance with the stream of data received;

a storage device for storing character data and display control data, the character data and the display control data respectively corresponding to predetermined combinations of bit patterns; and a controller for (i) extracting a combination of bit patterns from the received data stream, (ii) reading out the character data corresponding to the extracted combination of bit patterns when the extracted combination of bit patterns coincides with any one of the predetermined combinations of bit patterns corresponding to the character data to generate a message to be displayed based on the read out character data, (iii) reading out the display control data corresponding to the extracted combination of bit patterns and generating an auxiliary message to be added to the generated message and to be displayed in accordance with the read control data when the extracted combination of bit patterns coincides with any one of the predetermined combinations of bit patterns corresponding to the display control data, and (iv) displaying the message generated at (ii) and the auxiliary message generated at (iii).

12. The data receiver apparatus according to claim 11, further comprising an illustration storage device for storing illustrations in correspondence with the combinations of bit patterns corresponding to the display control data, and wherein when said controller detects the combination of bit patterns corresponding to the display control data, said controller reads out an illustration corresponding to the combination from said illustration storage device and displays the read out illustration together with the generated message on said display.

13. The data receiver apparatus according to claim 11, further comprising:

a time measuring circuit for measuring a present time; and a predetermined message storage device for storing predetermined messages corresponding to times, and wherein when said controller detects the combination of bit patterns corresponding to the display control data, said controller reads out the predetermined message corresponding to the present time measured by said time measuring circuit from said predetermined message storage device and displays the read out predetermined message on said display together with the generated message.

14. The data receiver apparatus according to claim 11, further comprising a name storage device for storing names of senders and corresponding identification numbers for identifying the senders, and wherein when said controller detects the identification number following the combination of bit patterns corresponding to the display control data, said controller reads out the name of the sender corresponding to the identification number from said name storage device and displays the read out name of the sender on said display together with the generated message.

15. The data receiver apparatus according to claim 11, further comprising informing means for informing a user of reception of the message, and wherein said controller displays the generated message on said display and causes said informing means to operate if a combination of bit patterns corresponding to the display control data is detected.

16. The data receiver apparatus according to claim 11, wherein said display control data comprises plural kinds of control data, and wherein one kind of display control data corresponding to the extracted bit pattern is read out.

17. The data receiver apparatus according to claim 11, wherein said predetermined combination of bit patterns is a combination of two 4-bit bit patterns.

18. A method for displaying a message in an apparatus operable to receive a stream of data and to display a message in accordance with the received stream of data, said method comprising the steps of:

storing character data and display control data, the character data and display control data respectively corresponding to predetermined combinations of bit patterns;

extracting a combination of bit patterns from the received data stream;

reading out the character data corresponding to the extracted combination of bit patterns when the extracted combination of bit patterns coincides with any one of the predetermined combination of bit patterns corresponding to the character data and generating a message to be displayed based on the read out character data;

reading out the display control data corresponding to the extracted combination of bit patterns when the extracted combination of bit patterns coincides with any one of the predetermined combinations of bit patterns corresponding to the display control data; and displaying the generated message in accordance with the read display control data.

19. The method according to claim 18, wherein said predetermined combination of bit patterns is a combination of two 4-bit bit patterns.

20. The method according to claim 18, wherein said character data represents an alphanumeric character.

21. The method according to claim 18, further comprising:

a step of storing illustrations in correspondence with the combinations of bit patterns corresponding to the display control data; and a step of, when the combination of bit patterns correspond to the display control data, reading out an illustration corresponding to said combination and displaying the read out illustration together with the generated message.

22. The method according to claim 18, further comprising:

a time measuring step of measuring a present time;

a predetermined message storage step of storing predetermined messages corresponding to times; and a step of reading out the predetermined message corresponding to the present time and displaying the read out predetermined message together with the generated message when the combination of bit patterns corresponding to the display control data is detected.

23. The method according to claim 18, further comprising:

a step of storing names of senders and corresponding identification numbers for identifying the senders; and a step of reading out the name of the sender corresponding to the identification number and displaying the read out name of the sender together with the generated message when the identification number following the combination of bit patterns corresponding to the display control data is detected.

* * * * *

UNITED STATES PATENT AND TRADEMARK OFFICE

CERTIFICATE OF CORRECTION

PATENT NO. : 6,097,935
DATED : August 1, 2000
INVENTOR(S) : Oh Takahashi et al.

It is certified that error appears in the above-identified patent and that said Letters Patent is hereby corrected as shown below:

Title page,
Item [56], References Cited, FOREIGN PATENT DOCUMENTS, insert

| | | |
|---|---|---|
| -- WO 89/06478 | 7/1989 | PCT |
| 0 680 024 A1 | 11/1995 | EUROPE |
| 0 597 449 A1 | 5/1994 | EUROPE |
| WO 90/16052 | 12/1990 | PCT --. |

Signed and Sealed this

Twenty-fifth Day of February, 2003

JAMES E. ROGAN
*Director of the United States Patent and Trademark Office*